US006999237B2

(12) United States Patent
Berman et al.

(10) Patent No.: US 6,999,237 B2
(45) Date of Patent: Feb. 14, 2006

(54) METHOD AND APPARATUS FOR CONFIGURATION AND ASSEMBLY OF A VIDEO PROJECTION LIGHT MANAGEMENT SYSTEM

(75) Inventors: Arthur Berman, San Jose, CA (US); Michael Detro, Los Gatos, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 266 days.

(21) Appl. No.: 10/202,595

(22) Filed: Jul. 24, 2002

(65) Prior Publication Data

US 2003/0063388 A1 Apr. 3, 2003

Related U.S. Application Data

(60) Provisional application No. 60/362,970, filed on Mar. 7, 2002, provisional application No. 60/356,207, filed on Feb. 11, 2002, provisional application No. 60/322,490, filed on Sep. 12, 2001.

(51) Int. Cl.
*G02B 27/10* (2006.01)

(52) U.S. Cl. ....................... 359/618; 359/634; 348/337

(58) Field of Classification Search ................ 359/618, 359/634, 831, 832; 353/33; 348/335–339
See application file for complete search history.

(56) References Cited

U.S. PATENT DOCUMENTS

| | | | | |
|---|---|---|---|---|
| 1,277,040 | A | | 8/1918 | Brewster |
| 3,965,683 | A | * | 6/1976 | Dix ......................... 60/641.15 |
| 4,151,554 | A | | 4/1979 | Tucker |
| 4,207,000 | A | * | 6/1980 | Miller ......................... 356/33 |
| 4,470,856 | A | * | 9/1984 | Little et al. ................... 156/64 |
| 4,544,237 | A | | 10/1985 | Gagnon |
| 4,913,528 | A | | 4/1990 | Hasegawa |
| 5,073,324 | A | * | 12/1991 | Beaudet ...................... 264/255 |
| 5,086,312 | A | * | 2/1992 | Tanaka et al. ................ 396/75 |
| 5,105,237 | A | * | 4/1992 | Hasegawa et al. ............ 257/98 |
| 5,151,800 | A | * | 9/1992 | Upatnieks .................... 359/14 |
| 5,168,351 | A | | 12/1992 | Bradley |
| 5,177,629 | A | | 1/1993 | Bohannon |
| 5,198,924 | A | * | 3/1993 | Jansson ...................... 359/350 |
| 5,497,268 | A | | 3/1996 | Tang |

(Continued)

FOREIGN PATENT DOCUMENTS

EP 0580169 1/1994

(Continued)

OTHER PUBLICATIONS

Tone Magazine, Issue #3, Mar.-Apr. 2000 http://www-.tone.co.nz/issue.asp?num=3.

(Continued)

*Primary Examiner*—Ricky Mack
(74) *Attorney, Agent, or Firm*—John Carpenter; Reed Smith, LLP

(57) ABSTRACT

A pathlength matched prism assembly is constructed from Polarizing Beam Splitter optical components having varying degrees of precision by arranging them in pathlength matched positions and fixing them to a baseplate or frame. Gaps between the optical components are sealed by the frame or adhesive sealant. Planar optical elements are inserted between the optical components and space between the components and elements is filled with an optical coupling fluid having an index of refraction that closely matches the index of refraction of both components and elements. An expansion compensation device is attached to the prism assembly to compensate of expansion and contraction of the optical coupling fluid. The prism assembly is best suited for use in HDTV and High Definition video projectors.

50 Claims, 13 Drawing Sheets

U.S. PATENT DOCUMENTS

| | | | | |
|---|---|---|---|---|
| 5,838,397 | A | 11/1998 | Stephens | |
| 5,865,520 | A | 2/1999 | Kavanagh et al. | |
| 5,986,814 | A | 11/1999 | Reinsch | |
| 6,046,858 | A | 4/2000 | Scott et al. | |
| 6,056,407 | A | 5/2000 | Iinuma et al. | |
| 6,089,719 | A | 7/2000 | Lin | |
| 6,139,154 | A | 10/2000 | Haba | |
| 6,176,586 | B1 | 1/2001 | Hirose et al. | |
| 6,183,090 | B1 | 2/2001 | Nakanishi et al. | |
| 6,183,091 | B1 | 2/2001 | Johnson et al. | |
| 6,247,814 | B1 | 6/2001 | Lin | |
| 6,262,851 | B1 | 7/2001 | Marshall | |
| 6,280,037 | B1 | 8/2001 | Smith | |
| 6,288,844 | B1 | 9/2001 | Edlinger et al. | |
| 6,304,302 | B1 | 10/2001 | Huang et al. | |
| 6,307,678 | B1 * | 10/2001 | Kosaka et al. | 359/557 |
| 6,309,071 | B1 | 10/2001 | Huang et al. | |
| 6,364,488 | B1 | 4/2002 | Lin | |
| 6,366,335 | B1 | 4/2002 | Hikmet et al. | |
| 6,375,330 | B1 | 4/2002 | Mihalakis | |
| 6,377,318 | B1 | 4/2002 | Menard | |
| 6,406,151 | B1 | 6/2002 | Fujimori | |
| 6,415,093 | B1 | 7/2002 | Nakamura et al. | |
| 6,454,416 | B1 | 9/2002 | Aoto et al. | |
| 6,504,661 | B1 | 1/2003 | Odille et al. | |
| 6,509,938 | B1 | 1/2003 | Okada et al. | |
| 6,611,379 | B1 | 8/2003 | Qian et al. | |
| 6,663,243 | B1 * | 12/2003 | Fielding et al. | 353/31 |
| 2001/0024556 | A1 | 9/2001 | Beguin et al. | |
| 2002/0001135 | A1 | 1/2002 | Berman et al. | |
| 2002/0024734 | A1 * | 2/2002 | Nakabayashi | 359/569 |
| 2002/0109820 | A1 | 8/2002 | Pan | |
| 2002/0140905 | A1 | 10/2002 | Ouchi et al. | |
| 2002/0176054 | A1 | 11/2002 | Mihalakis | |

FOREIGN PATENT DOCUMENTS

| | | | |
|---|---|---|---|
| JP | 56-077812 | | 6/1981 |
| JP | 04018590 A | * | 1/1992 |
| JP | 05-211357 | | 7/1993 |
| JP | 05-232304 | | 9/1993 |
| JP | 05-341254 | | 12/1993 |
| JP | 08-211357 | | 8/1996 |
| JP | 09197130 A | * | 7/1997 |
| WO | WO 02/04994 | | 1/2002 |

OTHER PUBLICATIONS

Robinson et al., (2000) "High Contrast Color Splitting Architecture Using Polarization Filters," *SID '00 Digest*, vol. 31.

* cited by examiner

METHOD AND APPARATUS FOR CONFIGURATION AND ASSEMBLY OF A VIDEO PROJECTION LIGHT MANAGEMENT SYSTEM

CROSS REFERENCE TO RELATED APPLICATIONS AND CLAIM OF PRIORITY

This invention claims priority to the following co-pending U.S. provisional patent applications, which are incorporated herein by reference, in its entirety:

Detro et al., U.S. Provisional Patent Application Ser. No. 60/322,490, entitled "An Improved Configuration and Means of Assembling the Light Management System used in a Microdisplay Based Video Projector,", filed Sep. 12, 2001;

Detro et al., U.S. Provisional Patent Application Ser. No. 60/356,207, entitled "Means to Accommodate Expansion in Liquid Coupled Prism Assemblies,", filed Feb. 11, 2002; and Detro et al., U.S. Provisional Patent Application Ser. No. 60/362,970, entitled "A Compact Means to Seal a Fluid Coupled Prism Assembly,", filed Mar. 07, 2002.

COPYRIGHT NOTICE

A portion of the disclosure of this patent document contains material which is subject to copyright protection. The copyright owner has not objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The invention relates to Light Management Systems (LMSs). The invention is more particularly related to improvements to LMS and their applications to reflective microdisplay based video projectors.

2. Discussion of Background

Light Management Systems (LMSs) are utilized in optical devices, particularly projection video devices and generally comprises a light source, condenser, kernel, projection lens, and a display screen, and related electronics. The function of the components of a video projector 100 is explained with reference to FIG. 1. As shown, white light 110 is generated by a light source 105. The light is collected, homogenized and formed into the proper shape by a condenser 115. UV and IR components are eliminated by filters (e.g., hot/cold mirrors 116/117). The white light 110 then enters a prism assembly 150 where it is polarized and broken into red, green and blue polarized light beams. A set of reflective microdisplays 152A, 152B, and 152C are provided and positioned to correspond to each of the polarized light beams (the prism assembly 150 with the attached microdisplays is called a kernel). The beams then follow different paths within the prism assembly 150 such that each beam is directed to a specific reflective microdisplay. The microdisplay that interacts with (reflects) the green beam displays the green content of a full color video image. The reflected green beam then contains the green content of the full color video image. Similarly for the blue and red microdisplays. On a pixel by pixel basis, the microdisplays modulate and then reflect the colored light beams. The prism assembly 150 then recombines the modulated beams into a modulated white light beam 160 that contains the full color video image. The resultant modulated white light beam 160 then exits the prism assembly 150 and enters a projection lens 165. Finally, the image-containing beam (white light beam 160 has been modulated and now contains the full color image) is projected onto a screen 170.

Commercially available prism assemblies include:

Digital Reflection's Star Prism
Philip's Trichroic Prism
IBM's X Prism with 3 PBS
S-Vision/Aurora System' Off-Axis Prism
Digital Reflection's MG Prism
ColorLink's ColorQuad Prism
Unaxis' ColorCorner Prism In the prism assembly, pathlengths are precisely matched. That is, the optical distance [] from each of the three microdisplays to an exit face (or output face) 155 of the prism assembly is essentially identical. This allows the microdisplays to be simultaneously in focus at the projection lens. In most currently available prism assemblies, the configuration of the prism assembly consists of precisely formed optical components that have been bonded together. The specific construction techniques by which this is accomplished provides differing advantages and disadvantages.

In some prism assembly configurations, an air gap is introduced between the microdisplays and a face on the prism assembly where the microdisplays are mounted. The air gap is a legitimate approach to accomplish pathlength matching, but has substantial disadvantages. For example, anti-reflection (AR) coatings are needed on the outer surfaces of the microdisplays and the prism assembly faces. The three microdisplays are aligned with respect to each other along all 6 axes of the microdisplay (x, y, z, roll, pitch, and yaw). Alignment is generally performed using mechanical positioners. Once alignment has been accomplished, the problem of maintaining the required precise alignment during the mechanical shock of appliance transport and during the thermal expansion/contraction that occurs while the video projector is in use still remains. In addition, the AR surfaces are exposed to dust, moisture and other atmospheric contaminates that may cause them to degrade. All of these factors reduce video projector performance.

In other prism assembly configurations the microdisplays are bonded to the faces of the prism assembly. Pathlength matching is accomplished by making the prism assembly have "perfect" (very precise) dimensions. Technologies currently being considered for producing these "perfect" dimensions include:

1. Tight Tolerance Component Fabrication

Source components may be fabricated to an extremely tight tolerance. However, such components are not currently available in high volume from vendors within the optics industry. When available, they will be very expensive.

2. Sort Components By Size

Measuring each component in an inventory and matching similarly sized components. The matched components are then used to construct a prism assembly. However, this requires an increased inventory of components from which to select matched sets of components.

3. Utilize Automated Assembly Equipment

The equipment measures the dimensions of each optical component and then actively adjusts their position during the assembly process. Such equipment must be custom designed and is expected to be quite expensive and inflexible.

In all three cases, extremely tight tolerances must be applied to the process used to assemble the optical components into the prism assembly. In all three cases, the outside dimensions of the resulting prism assembly, although having matched pathlengths, can still fall within a wide range. This requires that provisions be made within the video projector to mechanically adjust the position of the prism assembly with respect to the projection lens. Although bonding the microdisplays makes fabrication of the prism assembly more difficult, it has the advantage of eliminating the possibility of eventual misalignment of the microdisplays. In addition, the monolithic construction eliminates exposed surfaces and possible modes of degradation.

The prism assembly configurations each include several different types of plastic and/or glass materials. These disparate materials are bonded together. However, a difficulty arises because each material will have a different coefficient of thermal expansion. Since the prism assembly and its components will inevitably heat and cool during operation, the resulting expansion/contraction of the materials will generate stress (in fact, the process of assembly itself can build mechanical stresses into the prism assembly). Mechanical stress generates optical birefringence. Birefringence effects the polarization of the light beams traveling through the prism assembly and can be visualized on the screen as an undesirable artifact. It is, therefore, important to minimize the occurrence of stress within the prism assembly. One approach to minimize stress is to utilize glass that, in addition to meeting a long list of optical requirements, also has the lowest possible coefficient of stress induced birefringence. An example of one such glass is Schott's SF-57. The use of such a glass improves the situation but does not eliminate the problem.

Based on the considerations discussed above, it should be understood that there are many benefits to mounting the microdisplays directly onto the faces of the prism assembly. However, other various difficulties arise, including the expense of accomplishing the matching of the pathlengths and preparing microdisplays suitable for direct mounting. Furthermore, manufacturers of LMSs have had difficulties with attempts to implement such approaches in high volume manufacturing of any prism assembly configurations. The invention disclosed in this document consists of a prism assembly and construction techniques that can be applied to the construction of most prism assembly configurations (including all of those listed above). It enables inexpensive, high volume manufacturing of pathlength matched prism assemblies allowing the benefits of subsequent attachment of the microdisplays directly onto the faces of the prism assembly.

SUMMARY OF THE INVENTION

The present inventors have realized the need for cost effective pathlength matching and manufacturing techniques of Light Management Systems (LMSs) and particularly the construction of prism assemblies and microdisplay mounting on the prism assembly. The present invention describes a new approach to configuring the prism assembly, one that minimizes the undesirable optical consequences of mechanical stresses that arise within the prism assembly as a result of known construction techniques. The invention includes an inexpensive arrangement and method of constructing a pathlength matched prism assembly. The arrangement and method utilize less expensive, readily available optical components. Optically, the prism assemblies produced by this method are essentially identical and, therefore, can be used in a video projector with little need for mechanical adjustment. The invention can be applied to a wide range of prism assembly configurations and does not compromise other desirable mechanical or optical aspects of prism assembly performance.

In one embodiment, the present invention provides a prism assembly, comprising, a set of optical components arranged in pathlength matched positions, optical coupling fluid in contact with and between each of the optical components, and a frame affixed to each optical component and arranged so as to prevent optical coupling fluid leakage from between the optical components.

In another embodiment the present invention provides a prism assembly comprising, at least two optical components having imprecise dimensions configured to at least one of polarize, beam split, beam reflection and beam combine, said optical components fixed in a position such that pathlengths of beams directed through various paths in the prism assembly and to a focal point are matched, and an optical coupling fluid arranged in said pathlengths so as to contact at least two of the optical components.

In yet another embodiment, the present invention provides a prism assembly, comprising, a set of optical components, a baseplate attached to at least one of the optical components, a seal affixed to at least two of the optical components, and an optical coupling fluid disposed between the sealed optical components.

The present invention also includes a method of constructing a prism assembly, comprising the steps of, fixing a set of optical components to a baseplate, sealing spaces between the optical components, and filling spaces between the optical components with an optical coupling fluid. Various other methods and configurations will become apparent upon a detailed review of the disclosure and drawings as discussed below.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
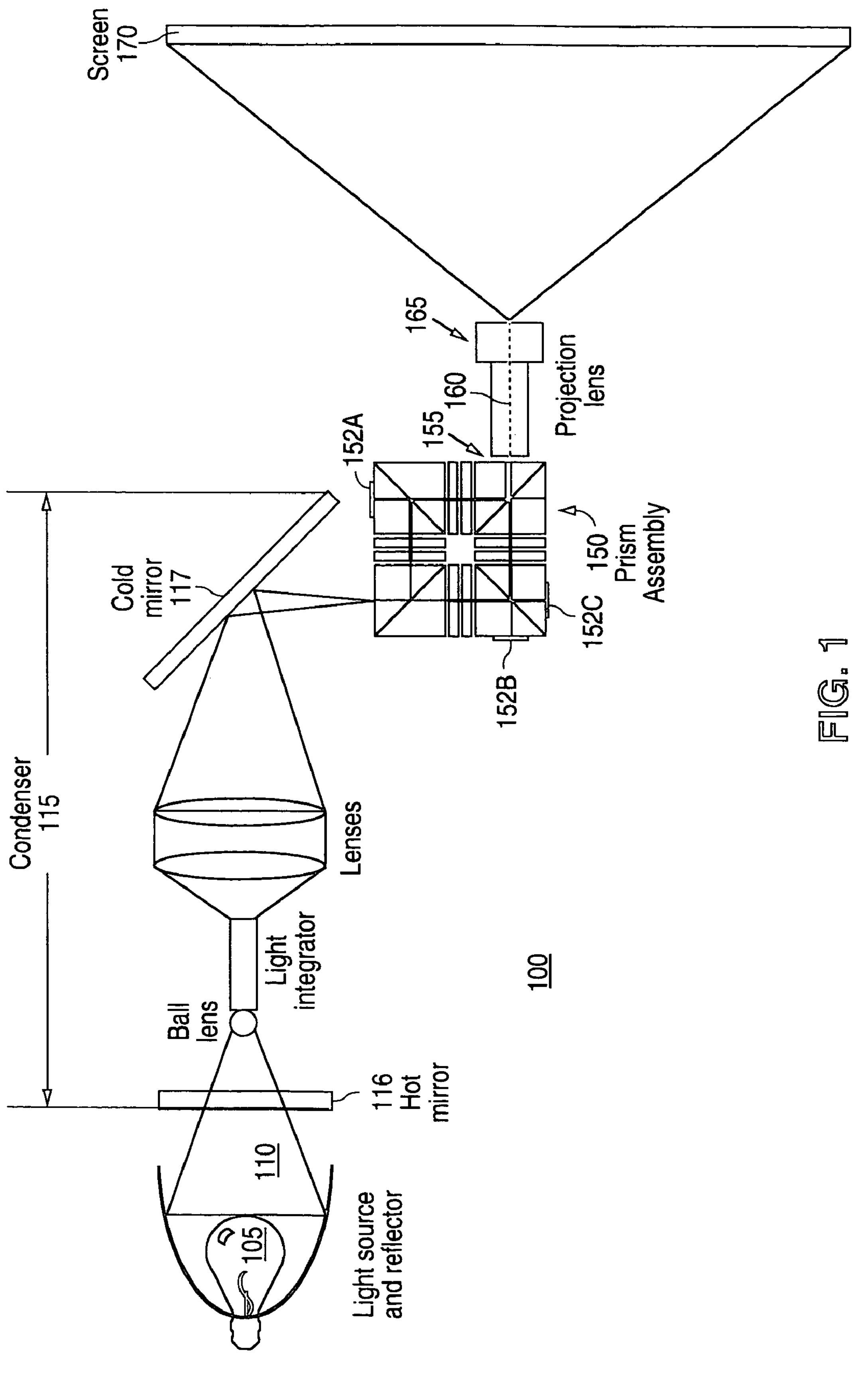
FIG. 1 is a drawing of a Light Management System (LMS) video projector.
Figure 2:
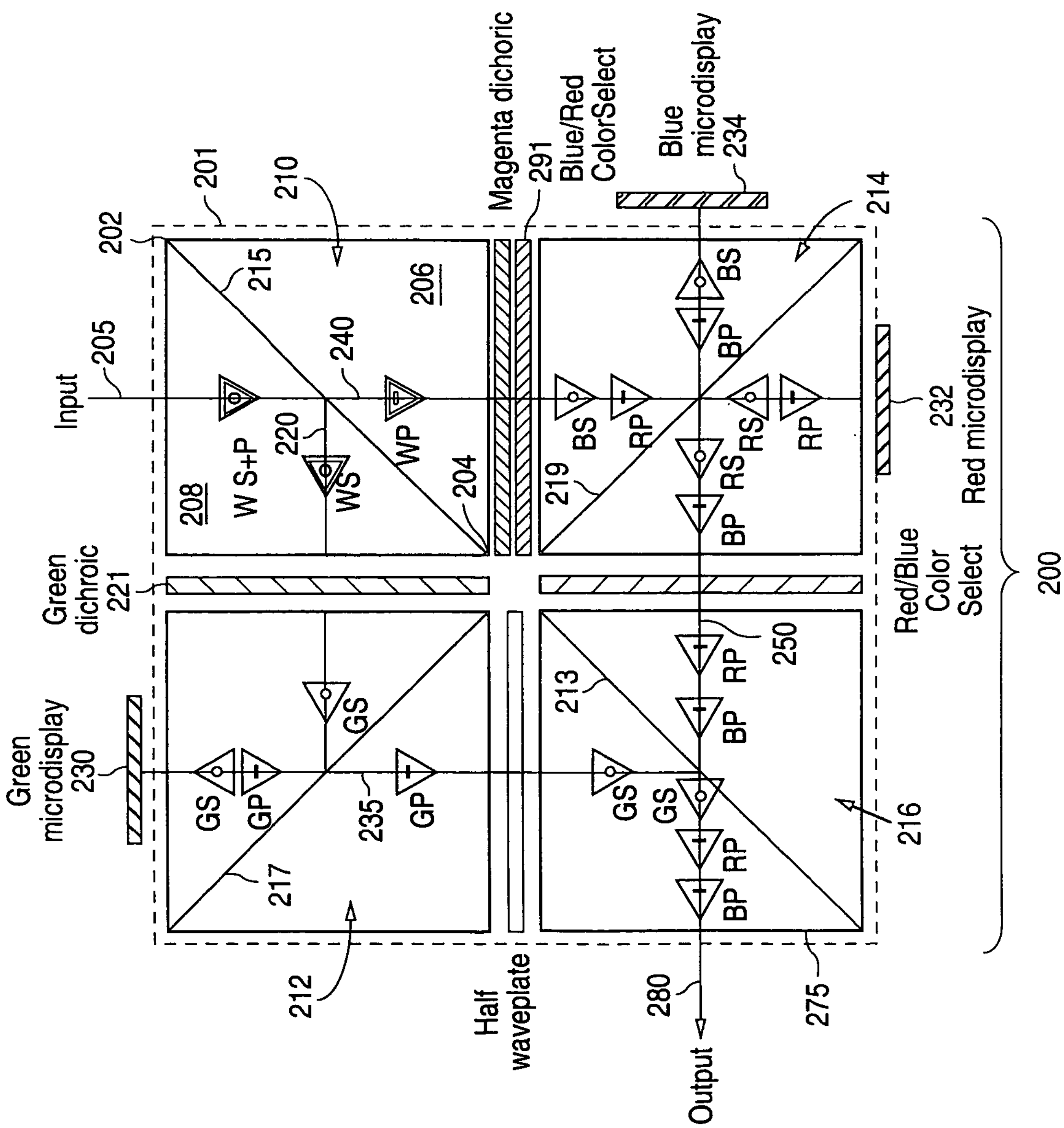
FIG. 2 is a drawing of a simplified example kernel illustrating lightpaths and components of one possible configuration of a prism assembly in which the present invention is applied.

Referring again to the drawings, wherein like reference numerals designate identical or corresponding parts, and more particularly to FIG. 2 thereof, there is illustrated a Light Management System (LMS) kernel 200 illustrating lightpaths and components of one possible configuration of a prism assembly in which the present invention is applied. Path length matching and other features are provided based on the present invention. The kernel 200 includes a prism assembly 201, attached microdisplays ("Green" microdisplay 230, "Red" microdisplay 232, and "Blue" microdisplay 234—the colors are in quotations because the color identifies the content of an image to be displayed, or the light being manipulated, by the individual microdisplay). The kernel is a fundamental component of a video projection system.

The prism assembly 201 comprises a set of optical components, films, and matching elements making a single prism assembly unit. A white light 205 is directed at a Polarizing Beam Splitter (PBS) 210. A polarizing beam splitter thin film 215 perpendicularly polarizes and splits the white light into two beams of polarized light 220 and 240. The lightpaths through the prism assembly are each labeled to indicate the color and polarization of each light path. For example, incoming white light 205 is labeled W S+P (meaning White S and P polarized); light beam 220 is initially labeled WS (meaning white, s-polarized). The s-polarized white light 220 passes through a green dichroic filter 221 (passing green light, making beam 220 a green s-polarized beam (and labeled GS)), and enters a second Beam Splitter 212. A polarizing beam splitter thin film 217 reflects the s-polarized green light to "green" microdisplay 230.

The green microdisplay 230 manipulates the polarized green light according to green content of an image to be displayed. The "green" microdisplay modulates the polarization of the green light on a pixel-by-pixel basis. For example, a no green content pixel of the image to be displayed will be left unaltered, a strong green content pixel of the image to be displayed will have its polarization rotated 90°, and other pixels having varying levels of green content will have their polarization rotated in varying amounts in proportion to the amount of green content. The microdisplay also reflects (reflection or other polarization effects on the light are accounted for by the polarization manipulation of the microdisplay) the green light (now modulated) back toward the polarizing beam splitter thin film 217.

The polarizing beam splitter thin film 217 then reflects some portions and passes other portions of the green light. The amount of light reflected versus passing is based on the amount of modulation performed on the reflected green light. Light with the same polarization as was reflected into the green microdisplay is again reflected. Light that is oppositely polarized (or at least different from a polarization sensitivity of the polarizing beam splitter thin film 217) is passed. Amounts of green light less than the full amount of original green light and more than 0 depend on the amount of modulation (modulation in this example is the amount of polarization rotation).

Beam 235 represents the modulated green light that passes back through the polarizing beam splitter thin film 217 (e.g. green light sufficiently modulated to pass through the polarizing beam splitter thin film 217). Beam 235 enters final Beam Splitter 216 and is reflected off polarizing beam splitter thin film 213. Each of the red and blue components are similarly modulated and passed or reflected from corresponding polarization sensitive materials, to produce beam 250. After reflecting off polarizing beam splitter thin film 213, the modulated green light beam 235 is combined with the red and blue components of beam 250 and then exits the prism assembly through output face 275 as white light 280 containing the image to be displayed.

PBSs 210, 212, 214, and 216 are constructed similarly. In this configuration, each PBS contains 2 optical components (e.g., prisms 208 and 206) and a polarizing beam splitter thin film (e.g. 215). The polarizing beam splitter thin film is, for example, a coating that reflects s-polarized light and passes p-polarized light. Optical elements (e.g., retarders, rotators, etc) are utilized to change the polarization so that desired light beams are either reflected or passed by the polarizing beam splitter thin film so that subsequent polarizing beam splitter thin films may pass or reflect the desired light beams depending on the configuration of optical components and the desired path of each light beam (FIG. 2 is one example configuration and desired paths). For example, when PBS 210 splits the incoming white light into 2 beams, the second beam 240 passes through a wavelength specific retarder (Blue/Red ColorSelect 291) so that PBS 214 can also split beam 240 into component beams directed to each of the red microdisplay 232 and blue microdisplay 234 (without the retarder, the blue component of the white light in beam 240 would remain p-polarized and PBS 214 would then pass the blue light to the red microdisplay 232 instead of reflecting it to the blue microdisplay 234).

The configuration of FIG. 2 illustrates a prism assembly made from 4 similarly constructed PBSs, an advantage over systems utilizing optical components performing a variety of functions (and hence, a variety of differently configured optical components) because the similarly constructed PBSs reduce the number of parts and different functionality of components in a particular optical design. Hence, a corresponding production line benefits from economies of scale, reduced inventory, etc. However, it can also be seen that many different combinations of optical elements can be utilized to make the various beams properly reflect or pass and then recombine into final light beam 280. Furthermore, the prism assemblies using optical components having a variety of different functions can be constructed. And, as noted above, prism assemblies of all these varieties (different sizes, different shapes, different configurations, etc.) may be constructed using the techniques and processes discussed herein.

Optical components are combined to create the beam splitters. For example, individual prisms 206 and 208 are optical components that are combined to produce the Polarizing Beam Splitter (PBS) 210. Before manufacture of the prism assembly, the beam splitting optical components are built. Prism assembly 201 illustrates four beam splitting optical components, polarizing beam splitters (PBSs) 210, 212, 214, and 216. Each of the polarizing beam splitters (hereinafter referred to as PBSs) contains a polarizing beam splitter thin film (e.g., 215, 217, 219, and 213). Preferably, the polarizing beam splitter thin films are at the diagonal of the beam splitters and extend through the corner as defined by the outside surfaces of the PBS. For example, the polarizing beam splitter thin film 215 extends along the diagonal of 206 and 208 through corners 202 and 204 of the PBS 210. The PBSs may be constructed so that the polarizing beam splitter thin film is on a plane of the diagonal and need not extend through the corners, particularly if light does not pass through the entire range of the diagonal.

The assembly of such PBS is accomplished by the use of optical pathlength matching. Referring to PBS 210, it can be noted that the two optical components (prisms) 206 and 208 need not be exactly the same size (and, consequently, the outside dimensions of the PBS need not meet any specific dimensional requirement). Since there are no specific dimensional requirements for the PBS, optical components with a "loose" mechanical tolerance may be utilized. Such optical components (and prisms used to construct those components) can be produced at modest cost and in high volume by existing vendors of optical components.

Figure 3:
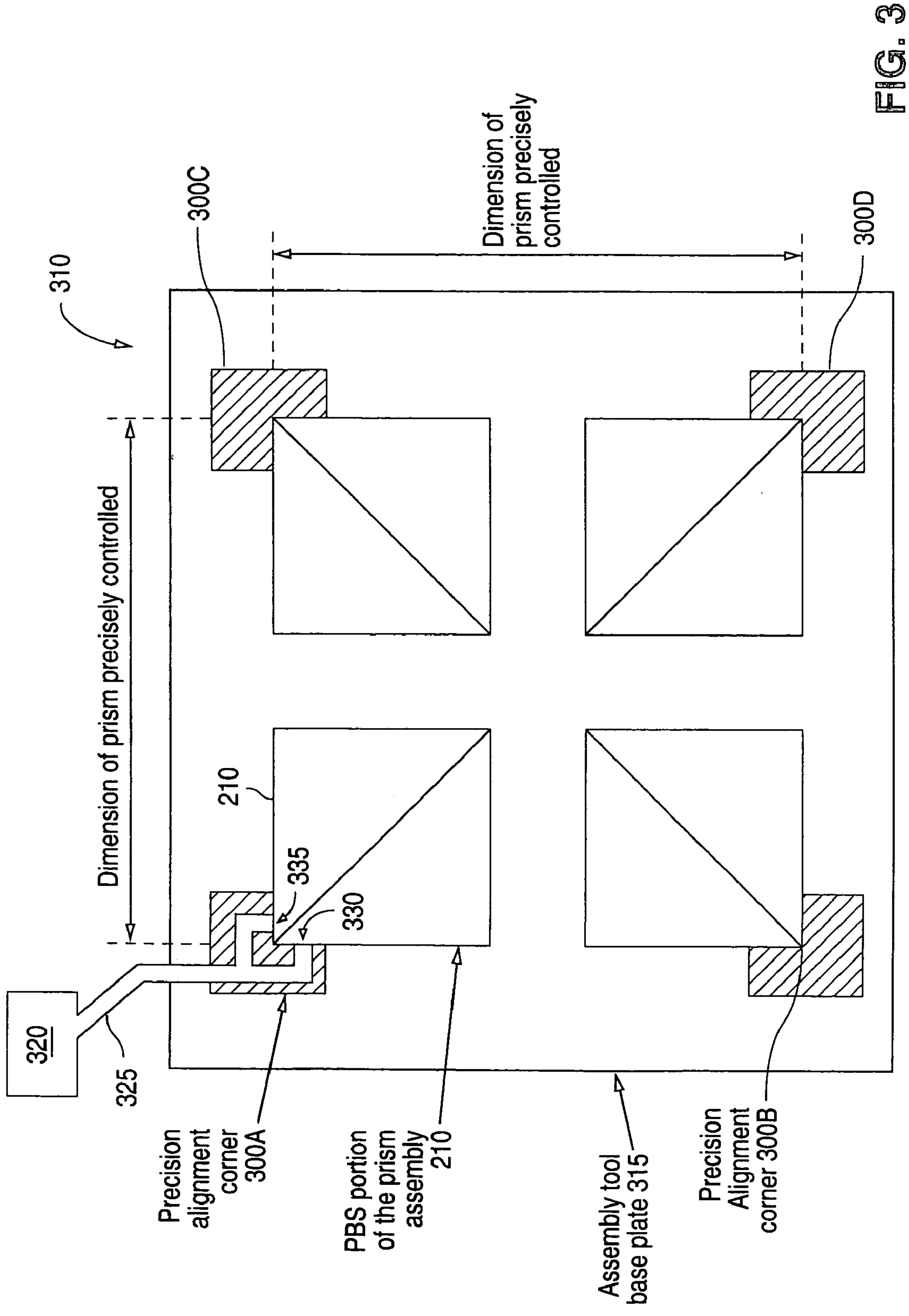
FIG. 3 is drawing illustrating a construction technique of an LMS prism assembly according to an embodiment of the present invention.

The optical components are assembled from the "outside in". As shown in FIG. 3, the two outside surfaces of each of the four PBSs in the prism assembly 201 are accurately held in position by precision alignment corners 300 of an assembly tool 310. For example, outside surfaces of PBS 210 are held in a fixed position determined by alignment corner 300A.

Assembly tool includes an assembly tool base plate 315 to which the precision alignment corners 300 are fixed. Construction of the alignment corners 300A, 300B, 300C, and 300D can be performed using mechanical tooling. The alignment corners are constructed to a tolerance and positioned on the assembly tool base plate such that they precisely fix the outside dimensions of each PBS. Each alignment corner includes a device for securing the PBS in position during assembly. For example, PBS 210 is held tight in alignment corner 300A via vacuum holders 330 and 335. The vacuum holders are connected to vacuum pump 330 via vacuum tube 325. In one embodiment, there is a single vacuum holder in the corner of the alignment corner.

The alignment corners provide the precise dimensional accuracy required to achieve pathlength matching and is accomplished by mechanical tooling rather than expensive tightly toleranced optical components. However, pathlength matching alone does not produce an acceptable prism assembly. Although pathlength matched, because the optical components are of varying non-precise tolerances (different sizes), the PBS do not fit precisely together (e.g., intersection of PBS 210 and 214, and any dichroics or filters placed therebetween, do not fit exactly) and an air gap is introduced between the internal optical surfaces of the PBSs. The air gap itself introduces other problems including refraction and other optical variations that need to be reduced or eliminated.

Figure 4:
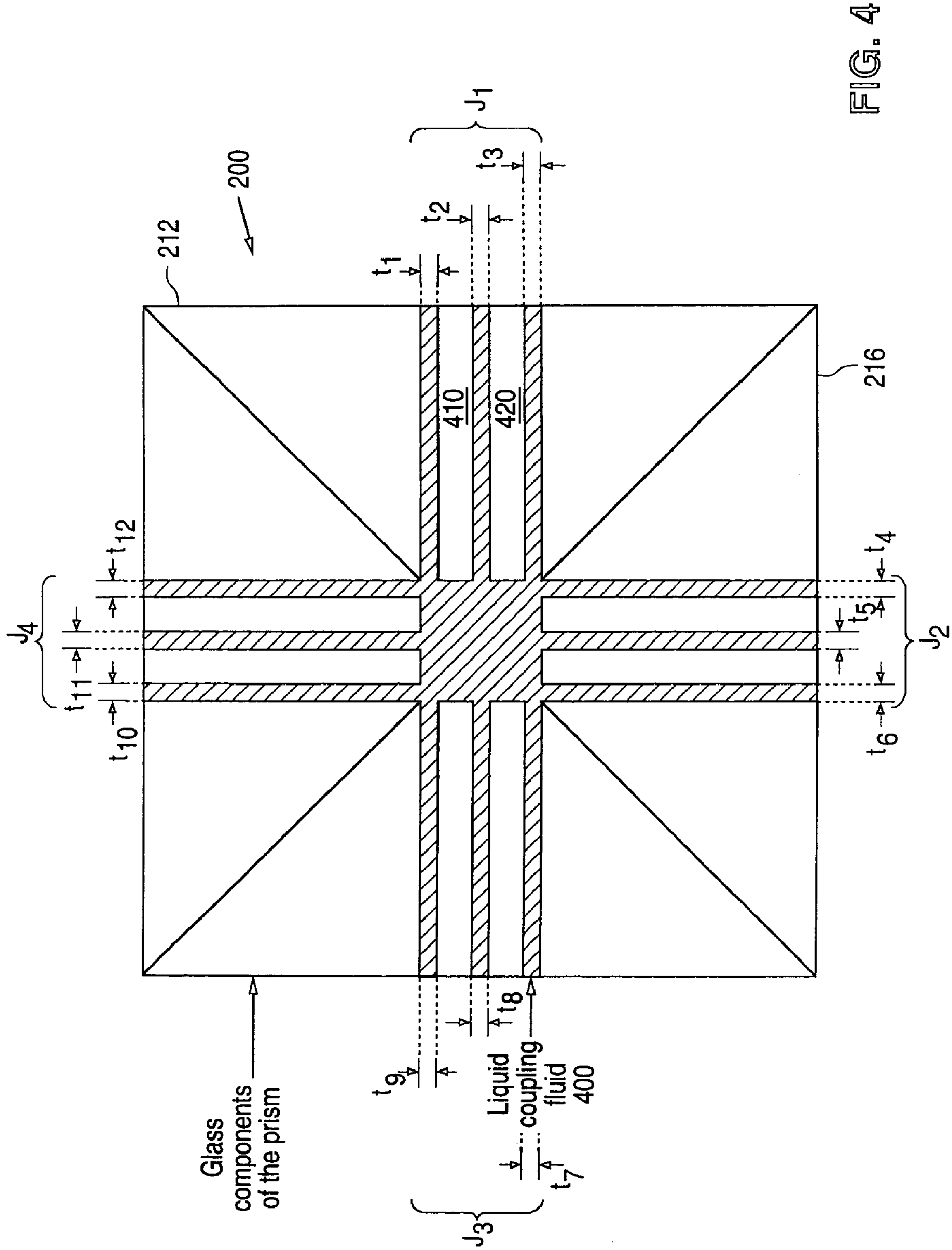
FIG. 4 is a drawing of liquid coupling of components in an LMS prism assembly according to an embodiment of the present invention.

The present invention reduces the undesirable effects from the imprecisely fit PBSs by coupling the PBSs with a liquid. In one embodiment, all internal optical surfaces of the prism assembly are coupled using a liquid. FIG. 4 is a drawing of liquid coupling of components of an optical assembly according to an embodiment of the present invention. Between adjacent PBSs is a joint that is filled with liquid. The thickness of the liquid filled joints is varied based on variations in size of the individual PBSs (or other optical components utilized in other prism assembly configurations) to maintain the desired exterior dimensions of the prism assembly (e.g., to maintain desired matched pathlengths within the prism assembly). For example, Liquid filled joint J1, the joint between PBS 212 and PBS 216 comprises liquid between the PBSs, the entire joint comprising the liquid coupling fluid 400 in spaces t1, t2, and t3, and dichroics and other optical elements placed between the PBS (e.g., optical element 410 and 420 placed between the PBS). The other optical elements may be, for example, any combination of dichroics or other filters. Accommodation in the liquid coupling fluid will prevent stress from building up in the components.

Figure 5B:
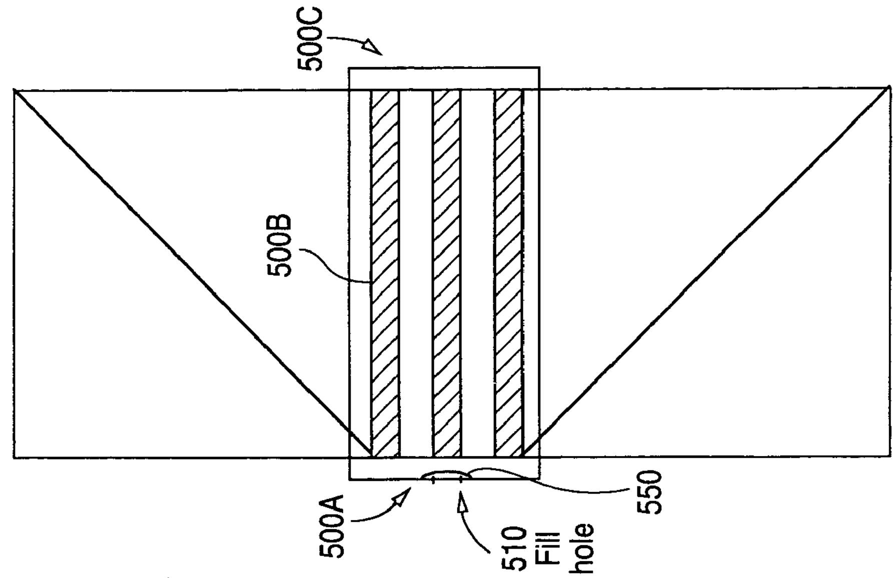
FIG. 5 is a drawing of top and side views of a frame that holds components of an LMS prism assembly according to an embodiment of the present invention.
Figure 5A:
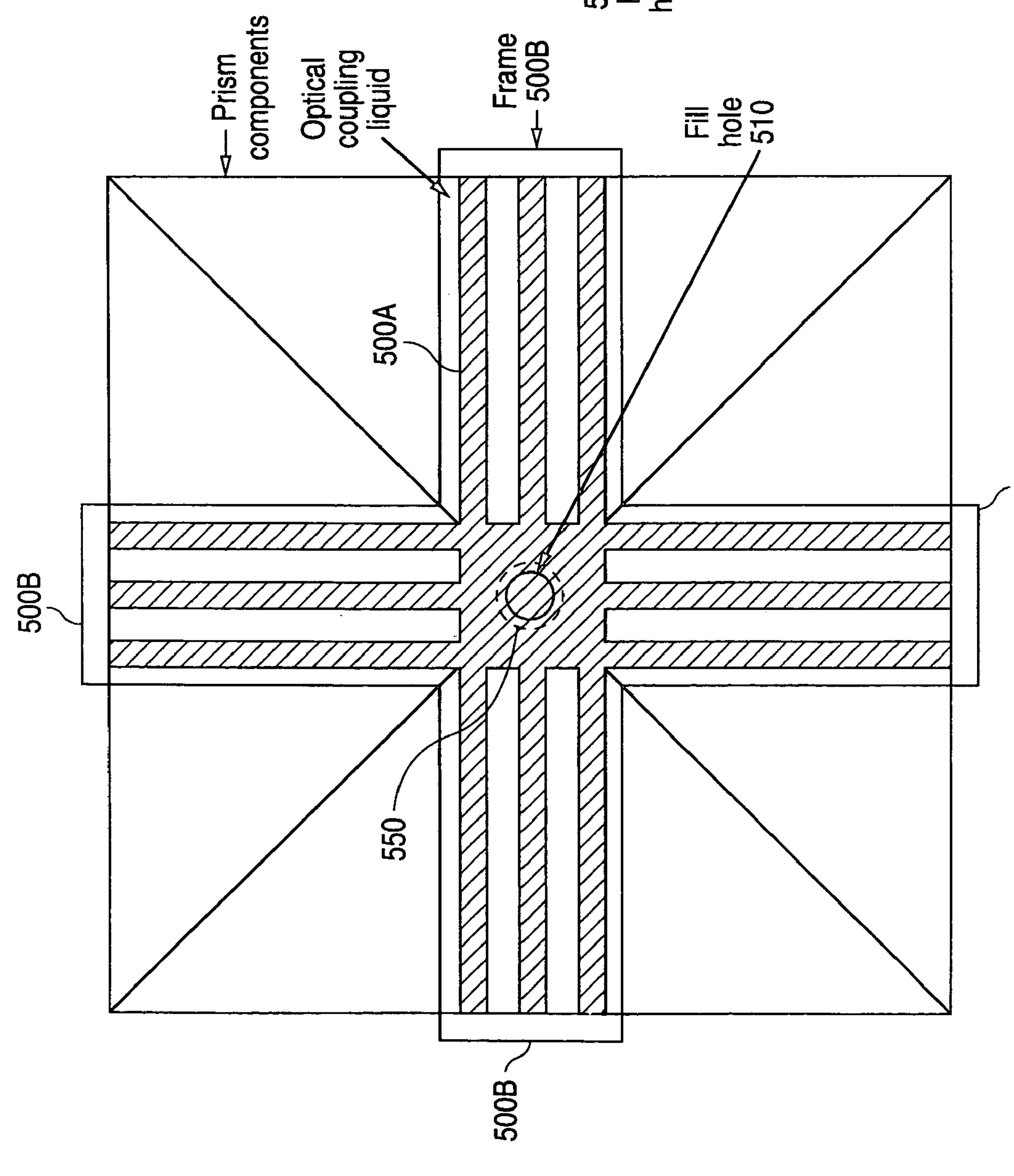

In one embodiment, a frame, glued to the external surfaces of the prism assembly, is used to contain the liquid and hold the components in place. FIG. 5 is a drawing of top and side views of a frame 500 that holds components of an LMS prism assembly according to an embodiment of the present invention. The frame 500, which can be made of one or several pieces (note that there are not any optical requirements on the frame material), is placed over each of the joints between the PBSs. In this embodiment, the frame 500 comprises 2 side components 500A and 500 C, and 4 edge components 500B. Each side component is a plus sign (+) shaped glass, plastic, acrylic, etc., or other material, each appendage of the plus sign covering a joint, and the middle of the plus sign covering a conjunction of all 4 joints. The edge components 500B cover the edge of each of one of the joints. The top side component 500A includes a fill hole 510 to which fluid may be applied and/or added as needed. A cap (not shown) is used to cap off the fill hole to prevent spillage of the fluid. An air bubble 550 is provided to compensate for liquid expansion/contraction and prevent stress build up on the optical components. The frame 500 is illustrated as a plus sign shape, but may be completely rectangular or any other shape, so long as it covers each joint sufficiently. Glue or other adhesive applied to the frame creates a seal between the frame and the PBSs so as to fully contain the coupling fluid. The glue or other adhesive also fixes the position of the PBSs to the frame to assure non-movement of the PBSs with respect to each other (maintaining the monolithic nature of the LMS).

Using the adhesive between the frame and PBSs to fix the matched pathlengths is performed by determining the matched pathlength positions of the prism assembly components (e.g., using a tool having corner pieces or other positioning devices to assure the correct optical pathlengths), and then gluing the components (e.g., PBSs) to one or more parts of the frame at those matched pathlength positions. Additional optical elements are then positioned in the joints (e.g., optical elements 410 and 420), the joints are then at least partly filled with optical coupling fluid (liquid coupling fluid), the joints are then capped with a top frame piece, and then the coupling fluid is topped off (except for the air bubble or other expansion air space), and then the fill hole is capped.

Figure 7:
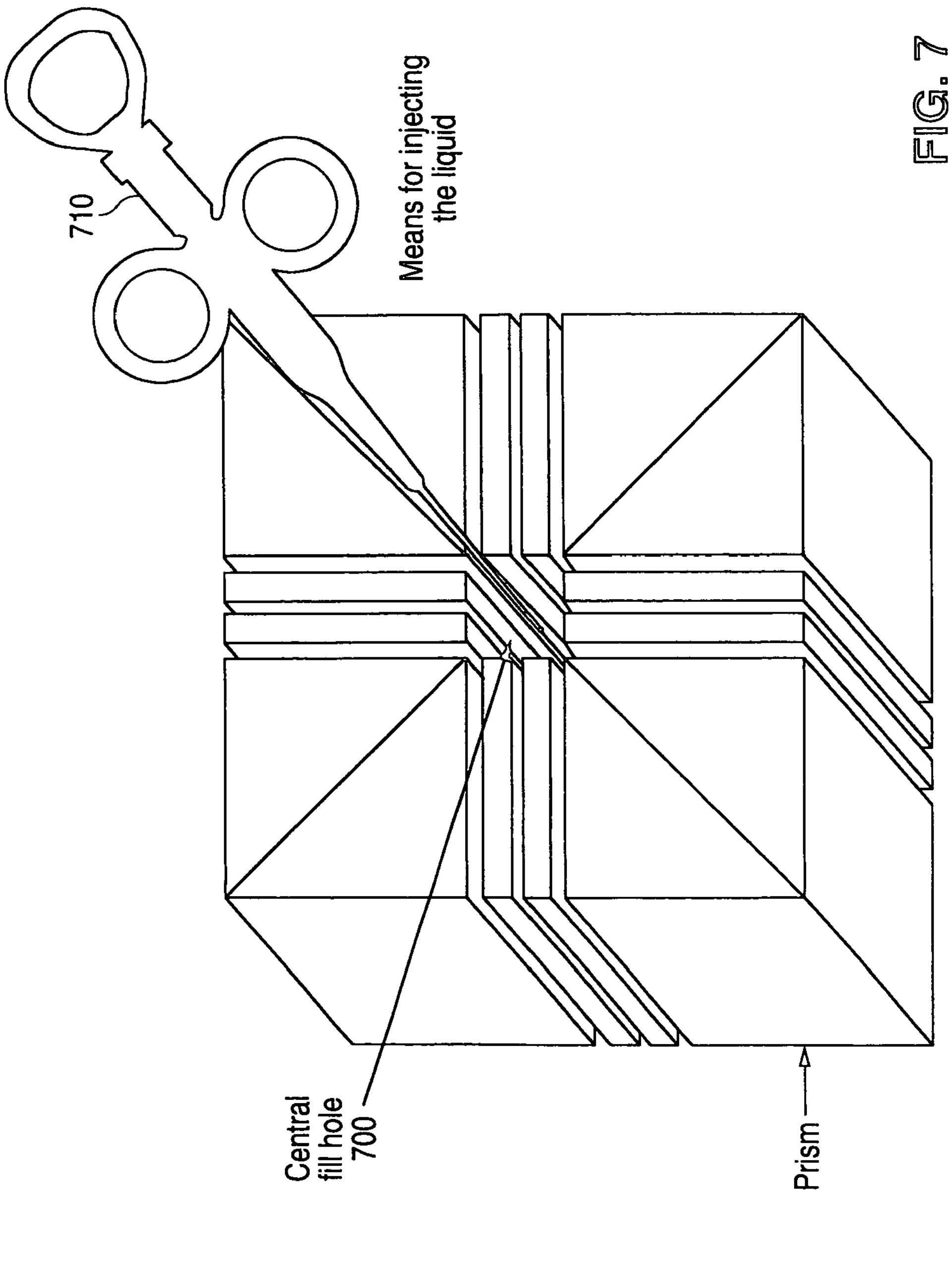
FIG. 7 is a drawing illustrating a coupling fluid filling method according to an embodiment of the present invention.

The present invention includes various methods and devices to fill the prism assembly with the coupling liquid. For example, FIG. 7 is a drawing illustrating a coupling fluid filling device and method according to an embodiment of the present invention. The coupling liquid is injected into a central fill hole 700 utilizing a syringe filled with coupling fluid. The central fill hole 700 is a center area of the prism assembly, and generally has no optical components therein. However, it is possible that one or more of the optical components may be positioned at least part way into the central fill hole. In one embodiment, the prism assembly is at least partly filled prior to affixing a top portion of the frame onto the prism assembly. If the top portion of the frame is not attached, the coupling fluid may also be applied in an area other than the central fill hole, but filling at the central fill hole is preferred. Also preferable, is injecting the coupling fluid at the bottom of the central fill hole. Capillary action between the optical elements and PBSs in both vertical and horizontal directions will assist the filling process. In other embodiments, the same process occurs with the top portion of the frame in place, in which case the syringe is inserted through the fill hole 510 (cap removed) to the bottom of the central fill hole 700, and the prism assembly is filled with coupling fluid. Other devices including tubes, pumps, or other pouring mechanisms may be used to place the fluid in the central fill hole.

Figure 6:
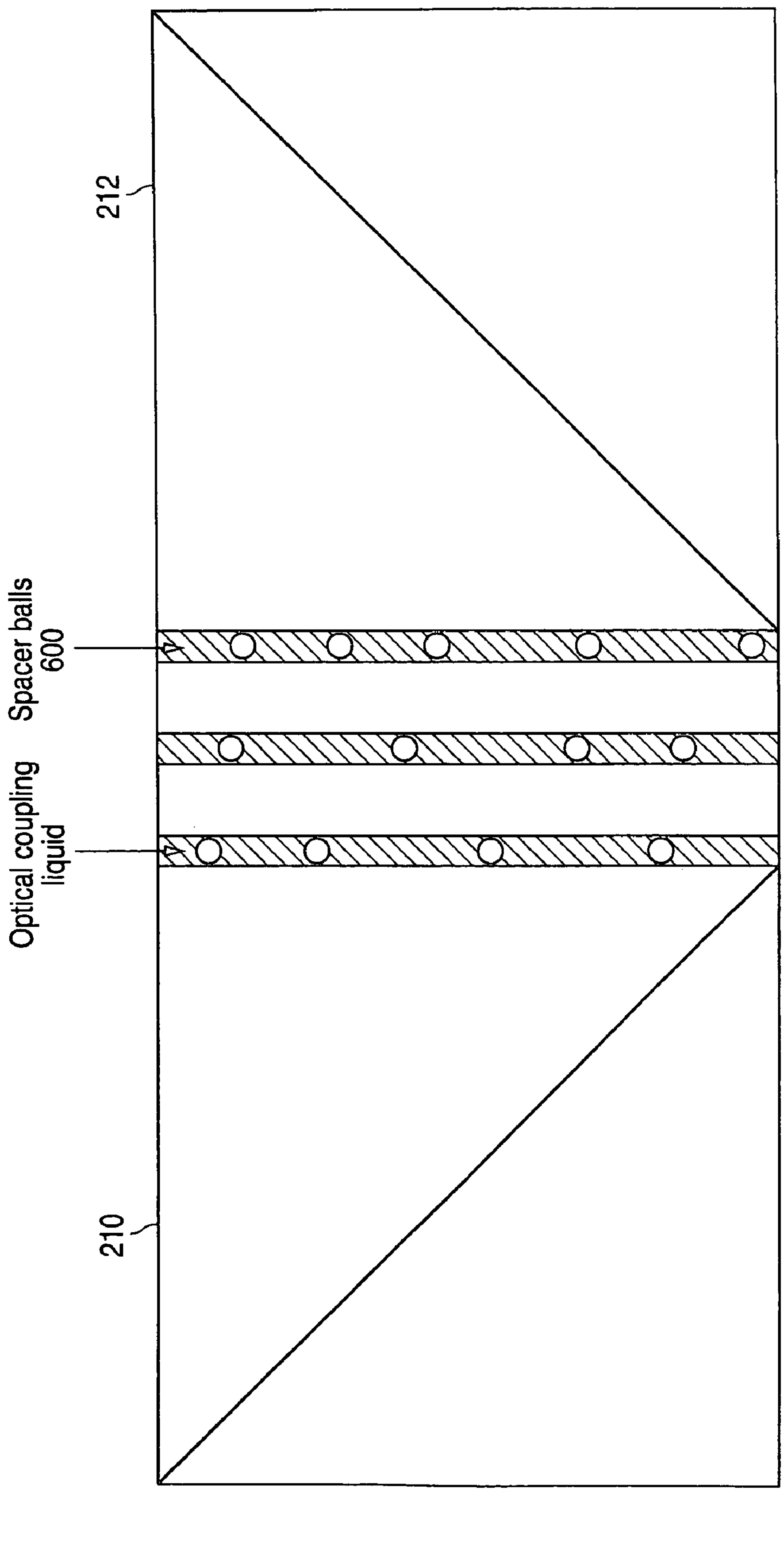
FIG. 6 is a drawing of spacers and liquid coupling of components of an LMS prism assembly according to an embodiment of the present invention.

Recognize that, if the components within the prism assembly were to directly touch (e.g., optical element 410 directly touching either optical element 420 or PBS 212), the result could be a visible artifact in an image projected by the prism assembly. The solution to this problem is to assure that a thin layer of liquid exists between the components and or elements of the optical assembly. Many different methods and/or devices may be implemented to assure that a layer of liquid exists between components. For example, the optical elements may be physically separated during filling of the coupling fluid, spacers may be affixed to portions of the frame to separate the elements and PBSs. In one embodiment, spacers are applied between the optical surfaces. FIG. 6 is a drawing of spacers (spacer balls 600) and liquid coupling of components of an LMS prism assembly according to an embodiment of the present invention. The spacers can be glass rods or balls with diameter on the order of thousandths of an inch. The index of refraction of the liquid coupling fluid is chosen to match that of the spacers thus rendering them invisible.

The present invention includes various methods and devices for application of the spacers. In one set of embodiments, the spacers are applied directly to the optical surfaces of the PBSs and/or optical elements. In one embodiment, the spacers are sprayed onto the optical surfaces. Spraying spacers onto optical surfaces may be performed using liquid crystal display manufacturing techniques and machinery. Either wet or dry spacer application may be utilized. In other embodiments, the spacers are suspended in the liquid coupling fluid at least during manufacture. After manufacture of the prism assembly, suspended spaces remain lodged between the optical surfaces and/or settle to a bottom portion of the prism assembly out of the viewing area.

The liquid coupling fluid is an optical coupling fluid selected to have an index of refraction that matches (or closely matches) the index of refraction of the PBSs and any optical elements spaced within the fluid. In one embodiment, the optical coupling fluid is at least one of mineral oil and other fluid having an index of refraction within 25% of the index of refraction of the optical components.

The index of refraction changes depending on wavelength, and is different for each of the components and elements in the prism assembly. Typical values are 1.52 for plastic elements, and 1.71 for glass components. The optical coupling fluid generally preferred to have an index of refraction in the 1.50–1.85 range. A 1.6 index of refraction optical coupling fluid has worked well in experiments carried out by the inventors. Similarly, in the embodiments using spacers, the optical coupling fluid is chosen to have an index of refraction preferably matching each of the PBSs, optical elements, and spacers as closely as possible. Matching the index of refraction can be done by splitting the difference between the index of refraction of the optical components and elements. Another method would be to perform an impedance matching type of arithmetic (e.g., taking the square root of the sum of the squares of the index of refraction of each optical component/element). However, the present inventors note that selection of any index of refraction between the high and low index of refraction of the optical components and elements provides better matching than any other embodiments of the pathlength matched prism assembly, including the gel, cured epoxy, and air filled embodiments discussed elsewhere herein. The chosen index of refraction of the coupling fluid may also be weighted toward matching component interfaces that occur more frequently in the prism assembly. In one embodiment, the index of refraction of the coupling fluid matches the index of refraction of the spacers.

Important properties for the coupling fluid are toxicity, flammability, yellowing propensity, chemical properties, and cost. Toxicity and flammability are safety considerations, the product is preferably non-toxic and non-flammable. Also, the optical coupling fluid, to be practical, needs to be resistant to yellowing, particularly under intense light and heat conditions. The optical coupling fluid has to have chemical properties that do not react with other optical elements, components, and parts of the prism assembly. And, to be commercially practical, the optical coupling fluid needs to be relatively inexpensive and readily available. In one embodiment, the optical coupling fluid is, for example, mineral oil. Many different types and properties of optical coupling fluid are commercially available (e.g., Cargille Corp makes many different types of index matching fluid).

In one embodiment, the optical coupling fluid is a UV curing adhesive, which, when cured, makes a solid prism assembly, the cured adhesive coupling the optical elements/components without fluids. However, the liquid filled embodiments have better index of refraction matching than commercially practical UV curing adhesive, so the liquid filled embodiments are preferred. In another embodiment, optical coupling is performed by inserting an optical coupling gel between the various components/elements of the prism assembly. NYE corporation makes one such gel (matching gel). In yet another embodiment, the coupling material is air, or another gas is utilized as a coupler between the optical components and elements. In the air-filled embodiment, anti-reflection coating are places on the surfaces of the optical elements and components to eliminate or reduce reflections.

Note that variations of the assembly techniques described herein can be applied to any of the prism assembly configurations discussed in this document.

There are several other advantages offered by the configuration and manufacturing method described above. These include the following:

Several prism assembly configurations include polarization-rotating component(s) (rotators) (e.g., rotating beam 235 after being passed by polarizing beam splitter thin film 217 so it is then reflected by polarizing beam splitter thin film 213). Rotators are generally constructed of layers of polycarbonate plastic bonded together. In prior systems, the adhesive needs to be able to bond the polycarbonate plastic of the rotator to the glass of the prism assembly components. The common solution to this problem is to purchase the polarizing rotator from the vendor in the form of a "sandwich". In "sandwich" form, the rotator has been bonded between two cover glasses. The cover glasses make it easier for the prism assembly manufacturer to bond the rotator into the prism assembly (e.g., bonding between surfaces of adjacent cover glasses). However, compared to the polycarbonate rotator itself, the sandwich may be available only in limited supply and is more expensive. In contrast, in the present invention, The liquid coupling method allows the direct use of the inexpensive, readily available polycarbonate component. Since with liquid coupling the polycarbonate is not bonded with adhesive, this class of problems is eliminated.

The precise outside dimensions of the prism assembly obtained using the new manufacturing method not only allow direct mounting of the microdisplays onto the prism assembly, but also allows for the use of precision (or fixed) mounting points for mounting the completed kernel (prism assembly with microdisplays attached) into the device in which it is to be used (e.g., light engine). The use of precision or fixed mounting points reduces or eliminates the need for a physical adjustment mechanism and procedure when mounting the kernel into the light engine.

Conventional prism assemblies generally utilize a series of glue cure steps. As the prism assembly grows in size and complexity, it becomes progressively more difficult to cure the adhesives due to the absorption of light by the glass and/or the optical properties of the components. Liquid coupling as provided by the present invention eliminates this problem and can greatly reduce the time required for prism assembly.

The present invention includes a device and method to hold the optical elements (e.g., optical elements 410 and 420) in place. The optical elements are also generally referred to as flat components because they are generally rectangular in shape and flat (having a thin width). However, the present invention may be practiced using different shapes and widths of the optical components.

Figure 8B:
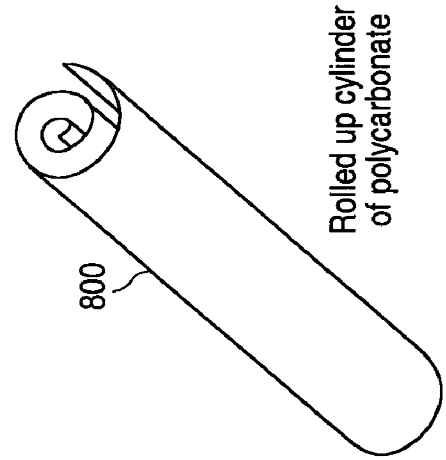
FIG. 8 is a drawing of an example mechanism utilized to hold prism assembly components according to an embodiment of the present invention.
Figure 8A:
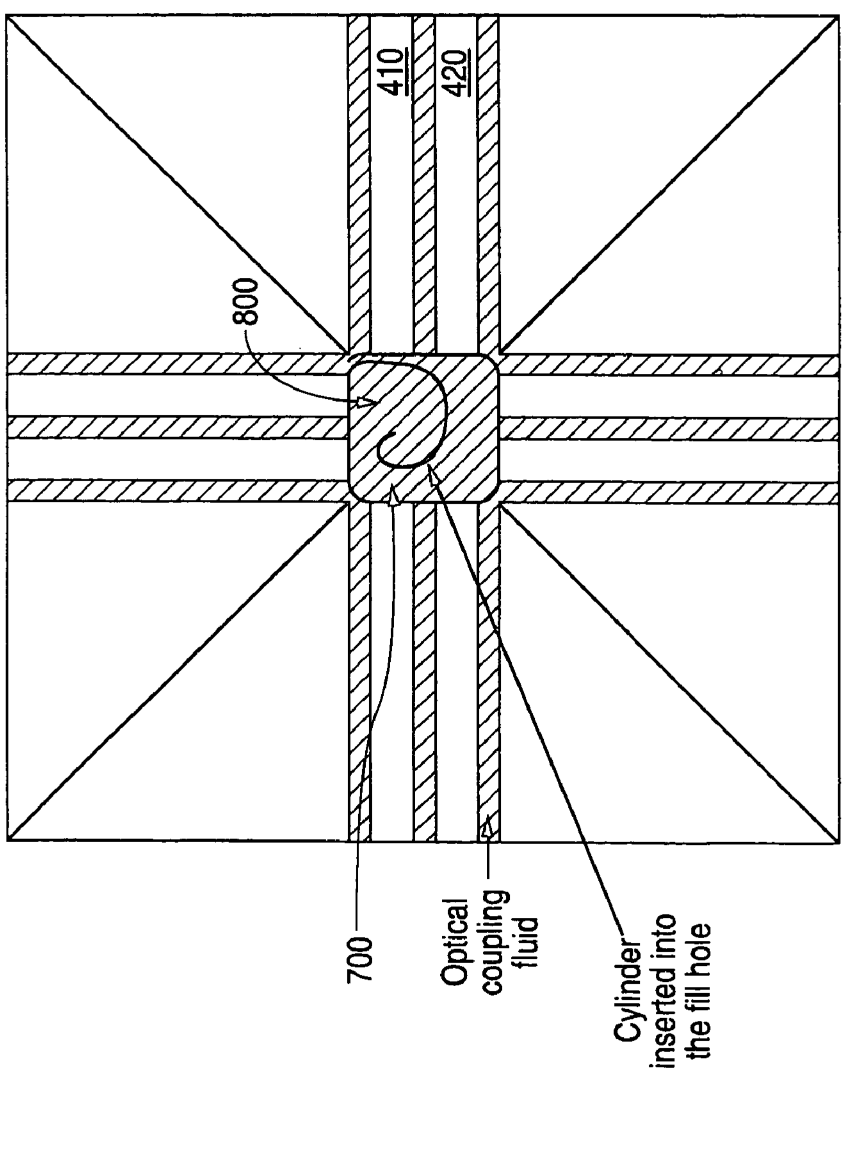

One concern at any time, including manufacture, shipping, storage, and/or during actual use is the potential movement of optical components in the coupling fluid. Movement towards the central fill hole 700 could potentially leave the moved component (or parts of the moved component) out of the optical path. The present invention provides for placing a spacer device in the central fill hole 700 to hold the flat components in a stable general location. FIG. 8 is a drawing of an example spacer device 800 utilized to hold optical components according to an embodiment of the present invention. In the illustrated embodiment, the spacer device 800 is a sheet of polycarbonate rolled into a tight cylinder. The spacer device 800 is inserted into the central fill hole 700. Once in place, the cylinder will "unroll" and press on the components so as to keep them out of the central hole.

As previously discussed an air bubble may be left inside the prism assembly to account for expansion of the various components. One problem with expansion of the components is that the components expand at different rates. As the optical coupling fluid expands, so does the optical components of the prism assembly. however, the expansion of the liquid and optical components is at different rates (differential expansion). In most cases, the optical coupling fluid expands at a higher rate than the optical components. Without the air bubble, an amount of stress is applied against the optical components by the expanding fluid. Without the air bubble, this stress can cause an undesirable amount of stress induced birefringence effecting the various light beams passing through the optical components of the prism assembly as the liquid coupling fluid expand.

Referring back to FIG. 5, an air bubble 550 is illustrated. The air bubble 550 is permanently maintained within the prism assembly once the fill hole 510 is capped. In FIG. 5, the "frame" elements (500A, 500B, and 500C) on the outside of the prism assembly serve both to contain the liquid and to hold the prism assembly components rigidly in space.

In the example embodiment of FIG. 5, the volume within the prism assembly surrounded by frame 500 is occupied by glass of the prism assembly components (e.g., PBSs), optical elements, and the optical coupling liquid. As the temperature of the prism assembly rises (as it will during operation) the linear and volume dimensions of all components increase. However, at least partly due to the fact that the coefficient of thermal volumetric expansion of the optical coupling liquid is considerably higher than that of the glass and other materials, when the temperature rises, the volume of the liquid expands faster that that of the glass "container" (optical components and frame bounding the liquid). In addition to the undesirable optical effects, excessive stress caused by this differential expansion could potentially cause the bonded components to separate. The air bubble 550 is one way to accommodate the effects of differential expansion and avoid the build up of stress.

Figure 9B:
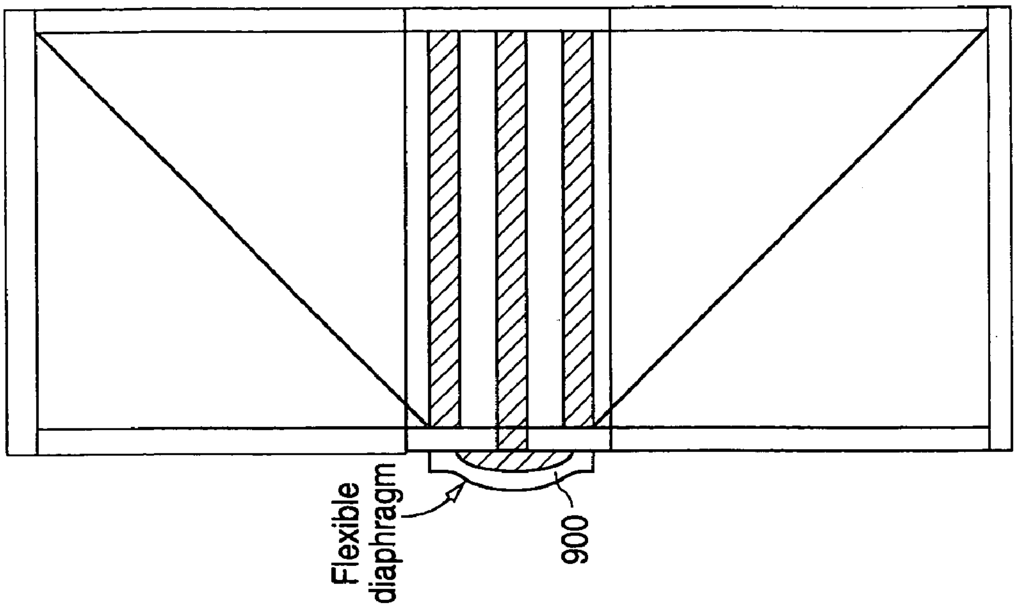
FIG. 9 is a drawing of a prism assembly equipped with a diaphragm 900 according to an embodiment of the present invention.
Figure 9A:
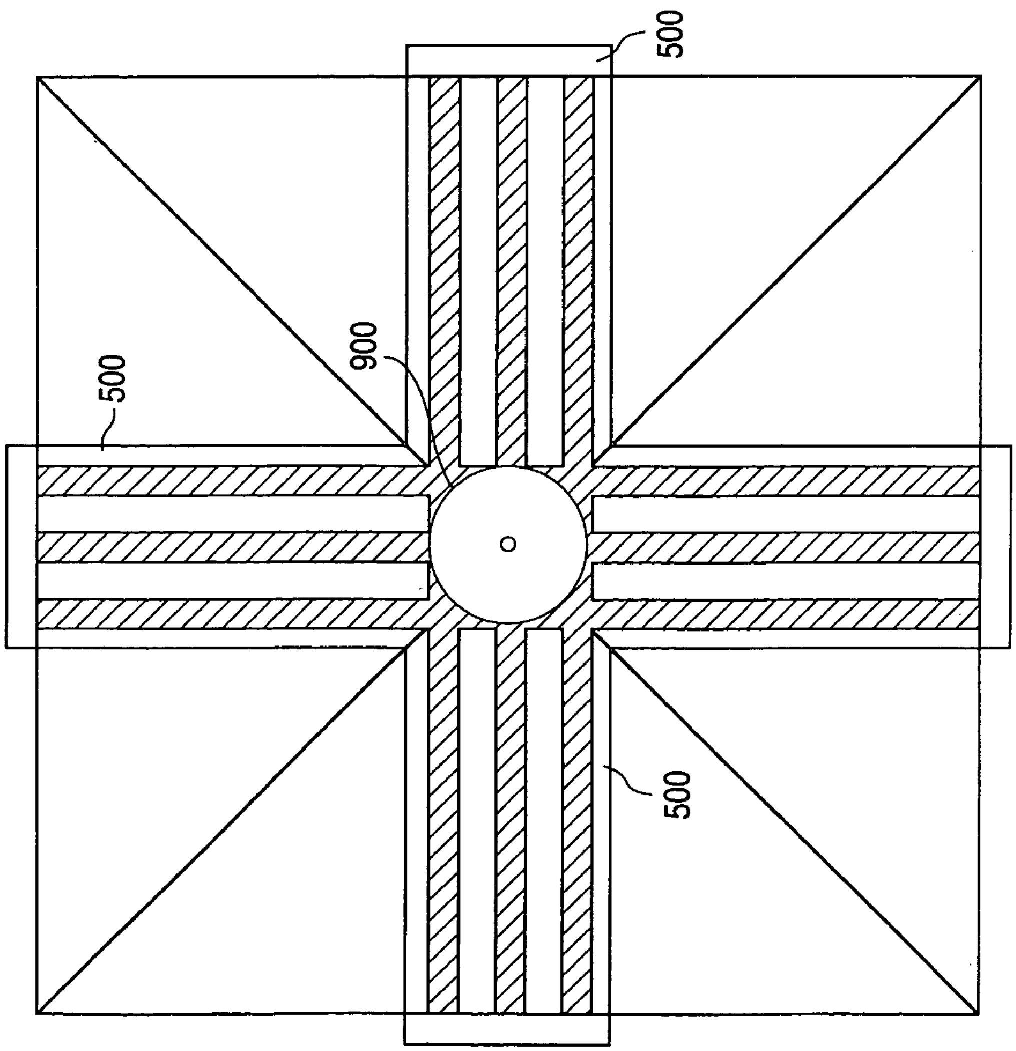

FIG. 9 is a drawing of a prism assembly equipped with a diaphragm 900 according to an embodiment of the present invention. The diaphragm 900 is constructed of a flexible material such as rubber, plastic, or another material with sufficient strength and flexibility to accommodate the expanding fluid and thereby relieve stress. The diaphragm 900 flexes as the volume of liquid increases or decreases. Preferably, the diaphragm 900 is circular and affixed over the fill hole 510 using an adhesive. However, other shapes and attachment mechanisms may be utilized (e.g., the flexible material fitted under a ring clipped to the frame around the fill hole).

Figure 10B:
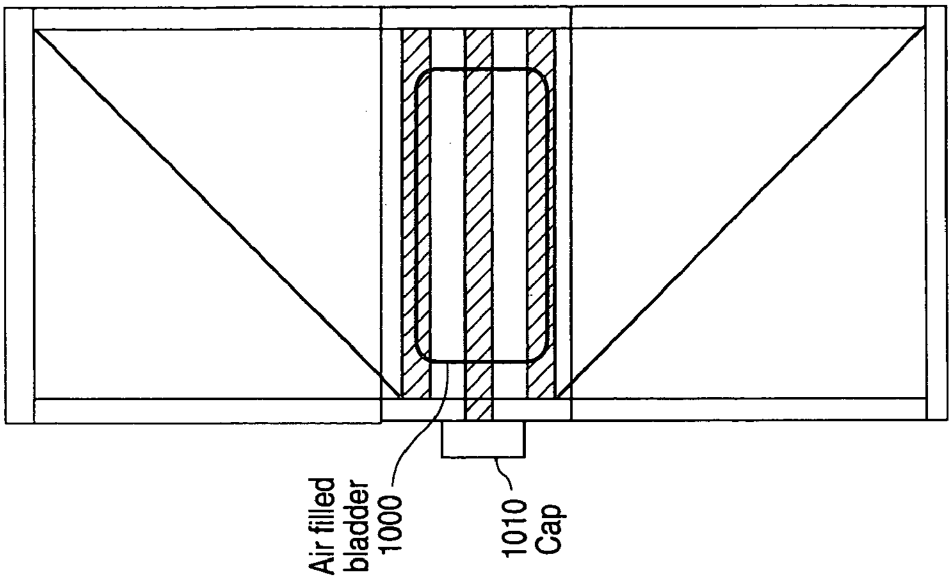
FIG. 10 is a drawing of an embodiment of a bladder equipped prism assembly according to an embodiment of the present invention.
Figure 10A:
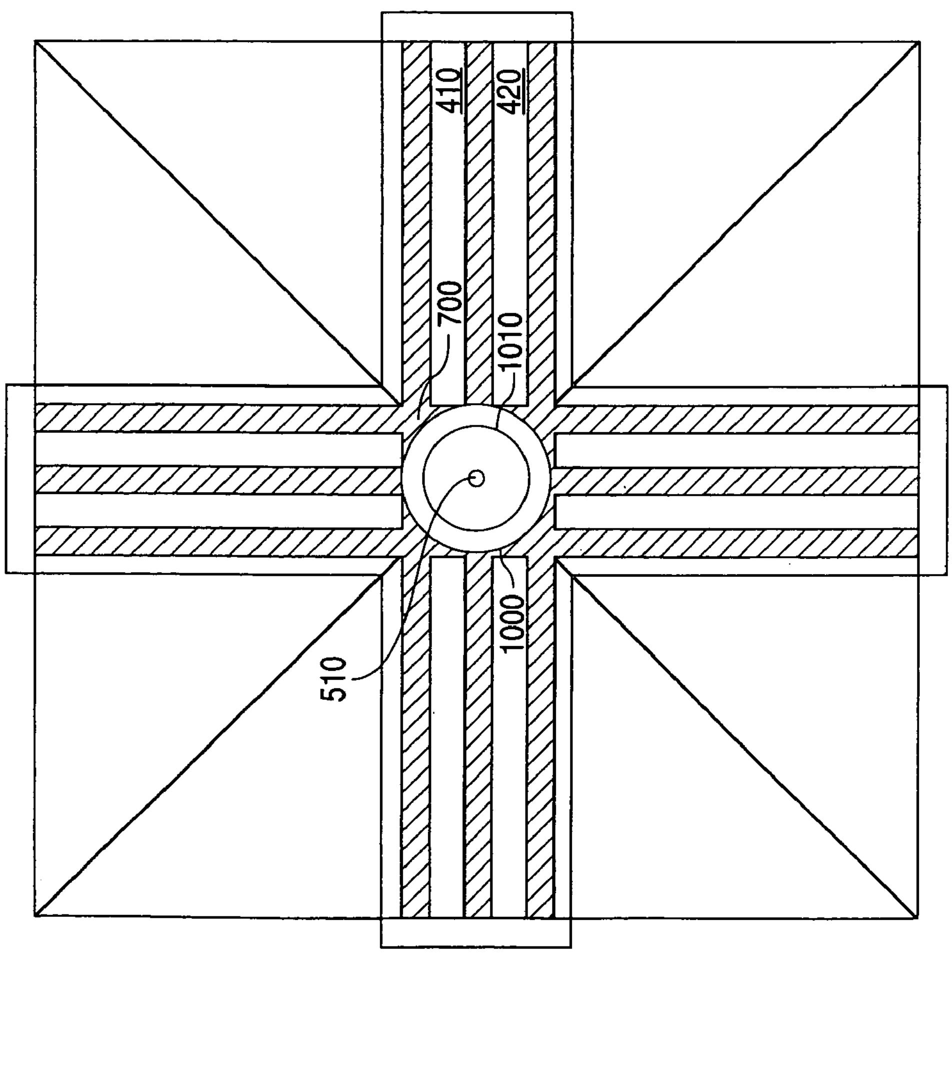

FIG. 10 is a drawing of an air bladder 1000 equipped prism assembly according to an embodiment of the present invention. In one embodiment, the frame 500 is capped (e.g., cap 1010), and a bladder is inserted inside the optical assembly. The bladder expands and contracts as the volume of liquid decreases and increases.

The air filled bladder 1000 is inserted into the fill channel (central fill hole 700). The volume of the bladder can increase or decrease to accommodate volumetric changes in the coupling liquid. In alternative embodiments, the bladder may be filled with any suitably compressible material (e.g., gas, liquid, solid, or combination thereof). The bladder 1000 can also serve to assist in holding those components in place that are not glued to the frame (e.g., the "flat" components (e.g., 410, 420) located between the polarized beamsplitting cubes). When configured to assist in holding the "flat" components in place, spacers such as polycarbonate roll 800 are not needed.

Figure 11B:
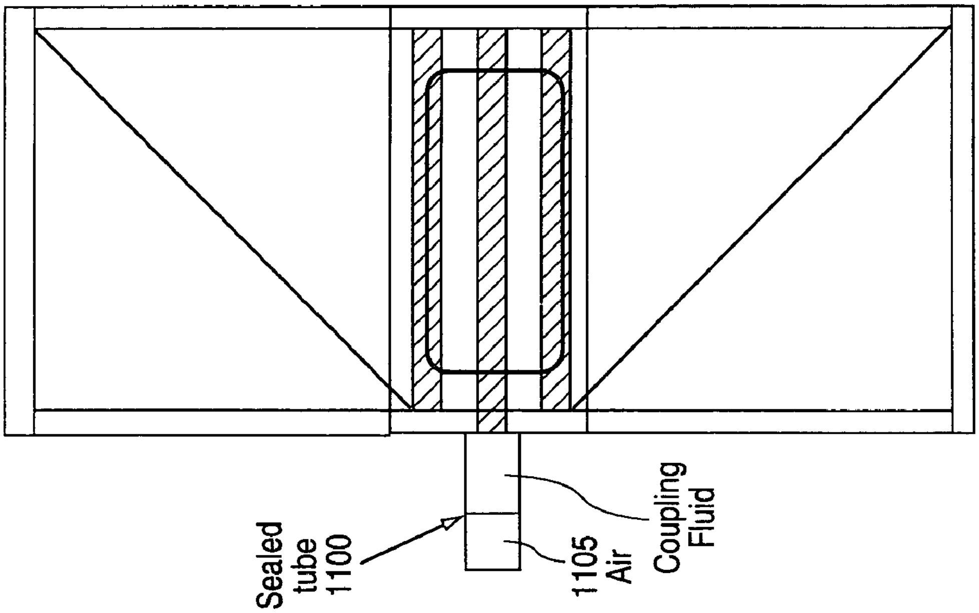
FIG. 11 is a drawing of an embodiment of a sealed tube assembly according to an embodiment of the present invention.
Figure 11A:
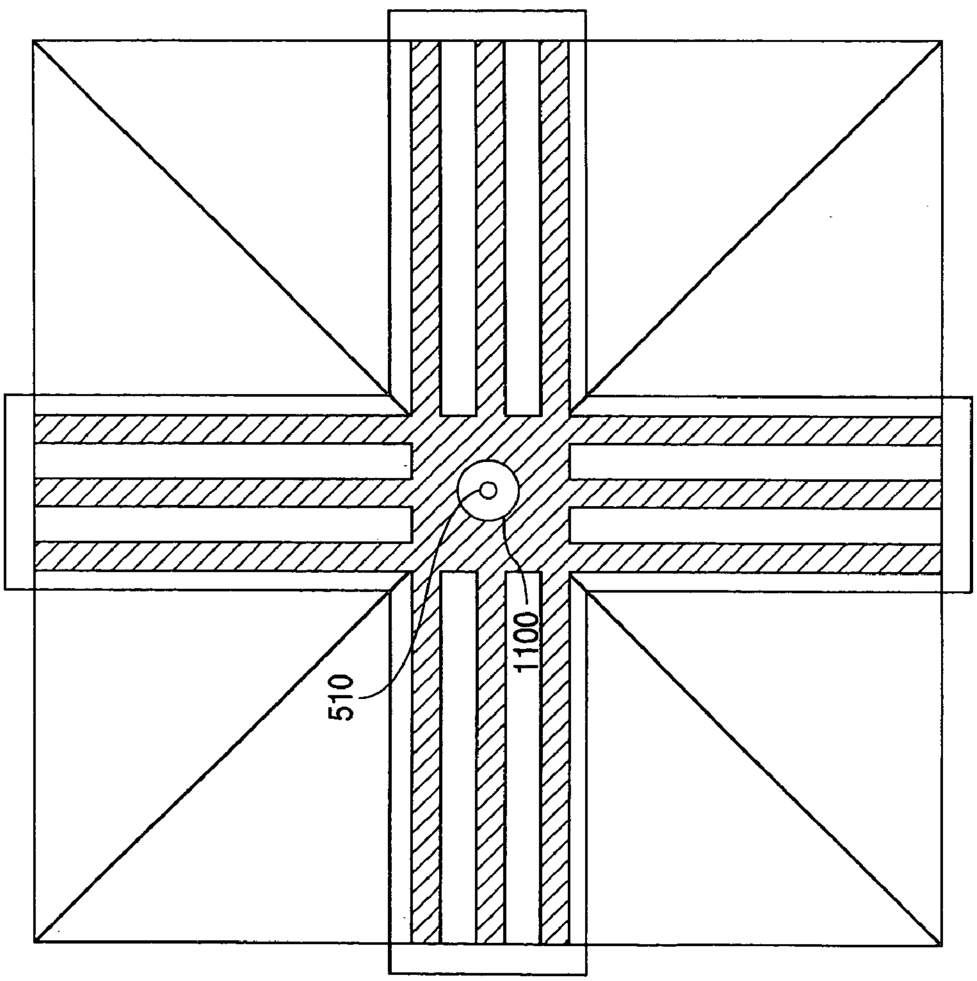

FIG. 11 is a drawing of an embodiment of a sealed tube 1100 assembly according to an embodiment of the present invention. A sealed tube 1100 is attached to the fill hole 510. A portion of the sealed tube 1100 contains an air bubble 1105. The air bubble 1105 will enlarge or shrink to accommodate expansion or contraction of the liquid within the prism assembly. In this approach, similar to the air bubble only approach discussed above, it is important to understand the orientation of the prism assembly in the light engine application. The reason being that the air bubble 1100 will migrate to the highest point within the prism assembly. It is therefore necessary to design the system such that the end of the tube is a high point. The tube may be configured with an elbow or other structure to direct the air bubble to an appropriate location. In the case of the air bubble only approach, it is therefore important that the high point of the prism assembly (high point of fluid in the prism assembly) is not at a point in of the optical paths of the prism assembly.

Figure 12B:
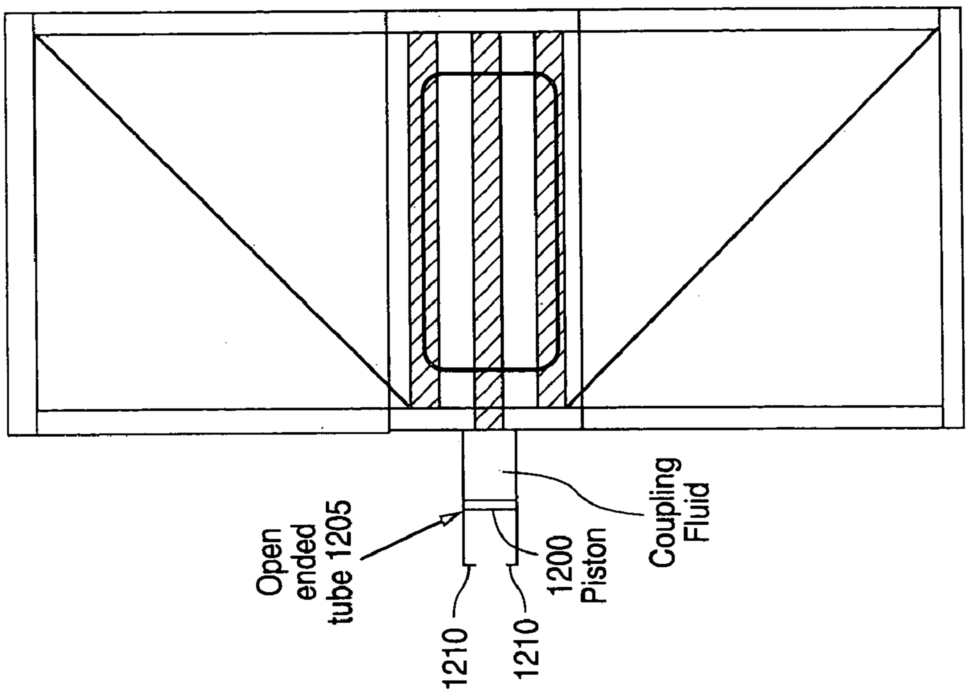
FIG. 12 is a drawing of an open air piston arrangement according to an embodiment of the present invention.
Figure 12A:
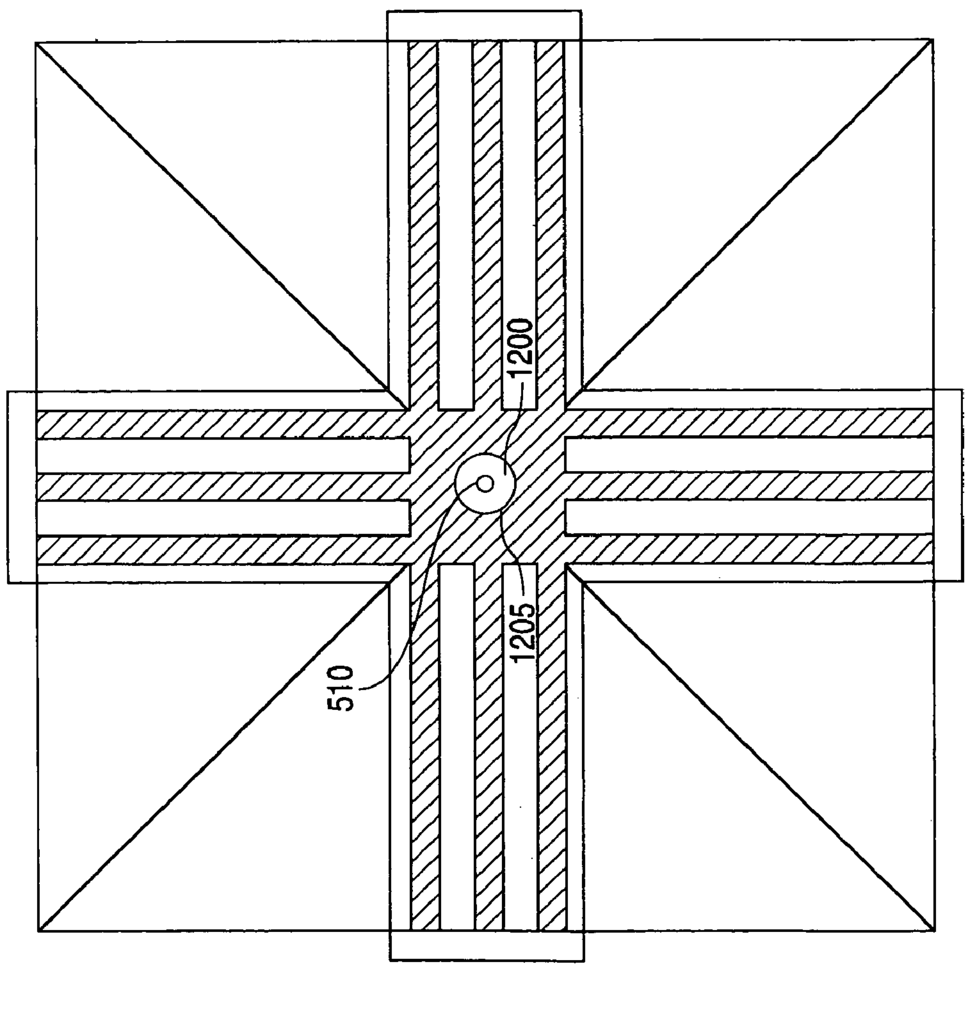

FIG. 12 is a drawing of an open air piston 1200 arrangement according to an embodiment of the present invention. An open ended tube 1205 is attached to the fill hole 510. A sliding piston 1200 fits snugly inside the open ended tube. As the optical coupling liquid expands with increasing temperature, the piston 1200 slides outward within the open ended tube. As the optical coupling liquid shrinks with decreasing temperature, surface tension (and/or pressure variance between the inside and the outside of the prism assembly) causes the piston to slide inward within the open ended tube 1205. In one embodiment, the open ended tube is longer than a predicted maximum expansion of the optical coupling fluid. In one alternative, stops 1210 are positioned inside the open ended tube to prevent the piston from reaching the open end of the tube 1205. In another alternative, the stops 1210 are electrodes connected to an emergency shut-off circuit, and the piston 1200 has a conductive material on its outer surface. When the piston contacts stops 1210, the light engine to which the prism assembly is installed is shut down at least until the prism assembly is sufficiently cooled to disengage piston 1200 from the stops 1210. As with all the embodiments listed herein, the open ended tube may be combined with one or more other embodiments (e.g., air bladder) to provide stress relief to compensate for the expanding and contracting optical coupling fluid.

Each of the above embodiments have an external frame (e.g., frame 500—external to the optical components of the prism assembly) that seals the prism assembly and contains the optical coupling fluid (and include any necessary attachments for any of the stress relief features discussed above). The frame also provides structural strength to the prism assembly. However, the present inventors have also realized the need for a compact arrangement for sealing the optical coupling fluid. The compact arrange then allows for the prism assembly to be utilized in a wider variety of optical applications, including different LCoS based video projection systems.

Furthermore, any newly designed and/or previously existing light engine systems can be fitted with a fluid coupled prism assembly. In new designs, fitting the liquid coupled prism assembly may be performed by fitting mounts within the projection system to accommodate one or more liquid coupled prism assembly sizes. However, in the case of retrofit systems (fitting liquid filled prism assemblies to previously sold projection systems and/or fitting liquid coupled prism assemblies to new projection system of a previous design), physical accommodation of the liquid coupled prism assemblies may not be so easily accomplished. That is, the physical size and shape of a fluid coupled prism assembly may not allow it to directly fit into the position provided for a conventional prism assembly within an existing light engine. The modifications of the light engine required to accommodate a fluid coupled prism assembly may be difficult, expensive or, in an extreme case, not possible. Therefore, by providing a fluid coupled prism assembly that is sealed and provides structural strength and has external dimensions that are similar to that of an equivalent conventional prism assembly, that prism assembly could be used as a drop in replacement for a conventional prism assembly in any light engine design. The invention disclosed in this document is such a means.

For these reasons, the present inventors have also developed an internally sealed prism assembly that seals and provides structural integrity to a liquid filled prism assembly.

Figure 13:
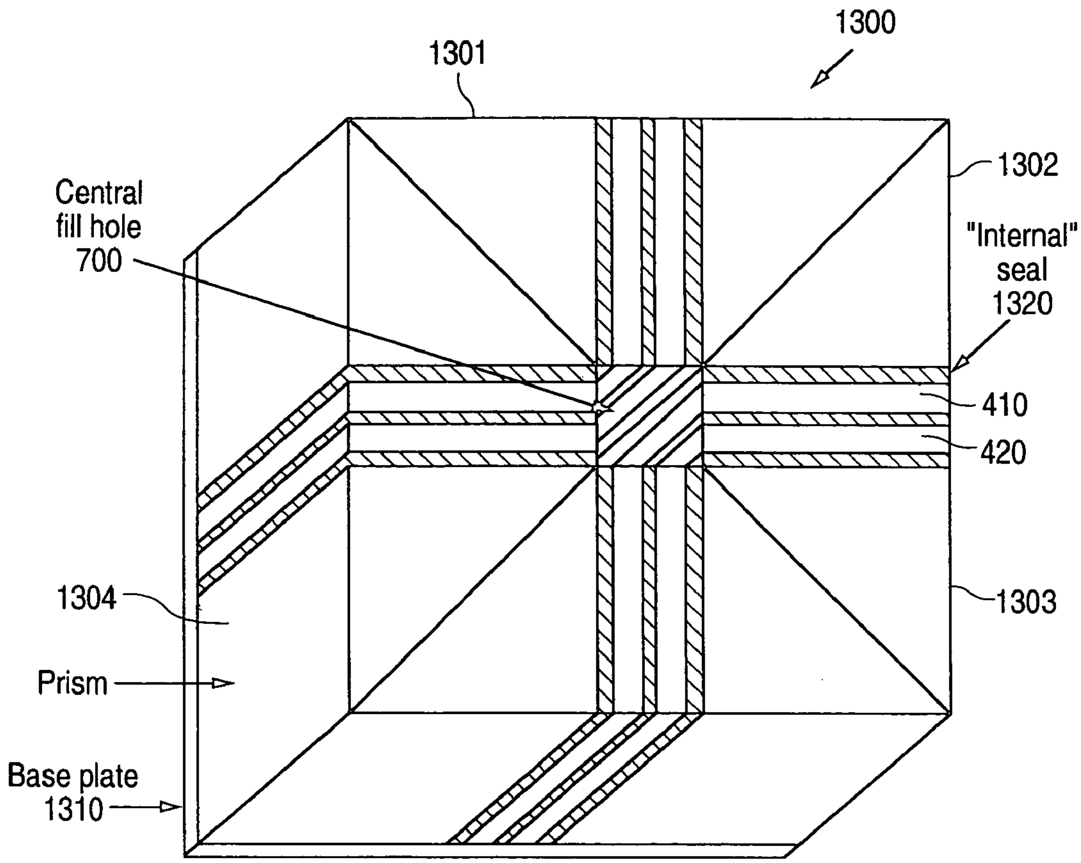
FIG. 13 is a drawing of an internally sealed prism assembly according to an embodiment of the present invention.

FIG. 13 is a drawing of an internally sealed prism assembly 1300 according to an embodiment of the present invention. The internally sealed prism assembly 1300 includes a baseplate 1310 and at least one internal seal 1320 between optical components of the prism assembly. Comparing this embodiment to the previous configurations, most features of the external frame are absent except the base plate 1310 (the base plate being a feature common to both the conventional and fluid coupled prism assembly configurations). The base plate 1310 provides a secure, firm surface for attaching the PBSs 1301–1304. As illustrated in FIG. 13, the internal seal is fitted between optical elements 410 and 420, between optical element 410 and PBS 1302, and between optical element 420 and PBS 1303. The internal seal extends downward from the top of the optical elements/PBSs a short distance (e.g., 1 mm) to produce a seal that maintains the optical coupling fluid installed into the prism assembly. In one embodiment, the internal seal also overlaps the tops of the optical elements 410 and 420, such that the seal covers the exposed surfaces of the optical elements, but preferably does not extend beyond the outer surface of the PBSs. In depth, the seals seeps between the optical elements/PBSs to a prescribed sealing depth (e.g., 1 mm).

Figure 14:
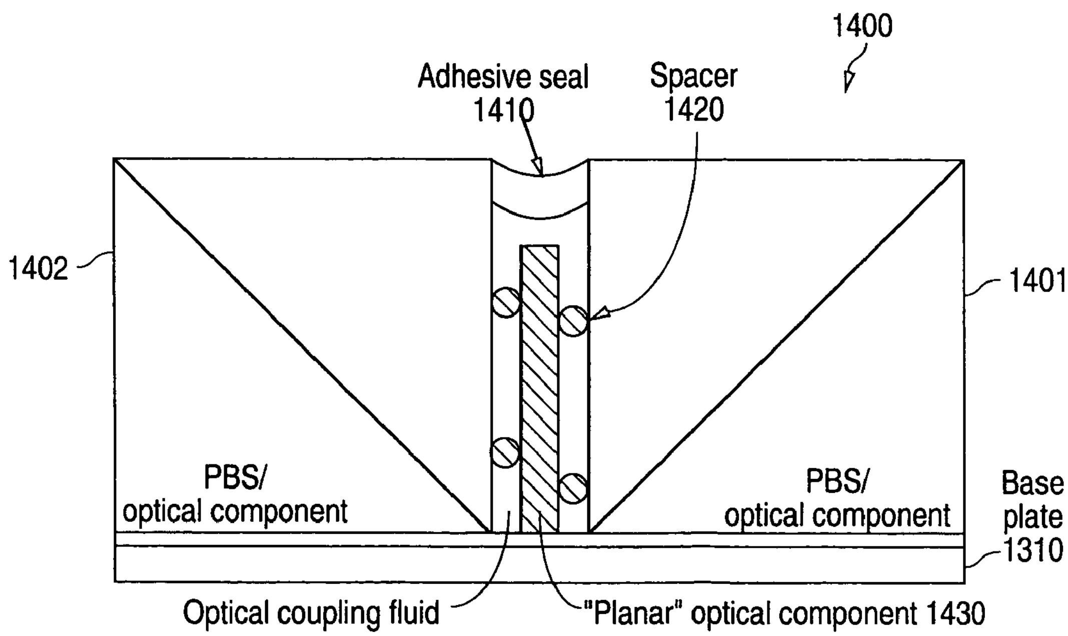
FIG. 14 is a close-up of an internal seal of an internally sealed prism assembly according to an embodiment of the present invention.

FIG. 14 is a close-up of an internal seal of an internally sealed prism assembly 1400 (part view) according to an embodiment of the present invention. In FIG. 14, 2 PBSs 4101 and 1402 have an internal seal 1410 between them. The internal seal may be described as a "picture frame" between the PBS elements. The adhesive does not extend beyond the outer surface of the prism assembly. Preferably, the internal seal is an adhesive agent that not only seals the prism assembly, preventing leakage of the optical coupling fluid, but may also provide additional rigidity to the entire structure. The adhesive may be, for example a 1 or 2 part epoxy or a UV cured adhesive that both hardens and seals.

Alternatively, the adhesive seal may be a pliant adhesive such as silicone based adhesives. However, flexing of the prism assembly can become an issue if non-hardened sealant is utilized. While the bottom plate of the frame provides enough rigidity that pliant adhesives may be acceptable in some applications, a top plate (on the side of the prism assembly opposite the base plate) in addition to the base plate adds enough rigidity that pliant adhesives are fully acceptable in most all applications.

FIG. 14 also illustrates an optical element ("Planar" optical component 1430) separated by spacers 1420. The optical element is shorter than a bottom height of the adhesive sealant. The optical element is representative and may in fact be several optical elements also separated from the PBSs and each other via additional spacers. The "planar" optical components 1410 are items such as dichroics, reflective polarizers and wavelength specific retarders contained between the PBSs and suspended in the optical coupling liquid. The planar components are spaced from the glass surfaces by use of spacer elements as discussed previously. Penetration (the prescribed sealing depth) of the adhesive 1410 is confined to a region out of the optical path. The base plate 1310 provides the required rigidity to the prism assembly.

As explained above, the principle advantages of the disclosed liquid coupled prism assembly techniques and configurations include the ability to use less expensive, low tolerance glass components, and the ability to fabricate a prism assembly with "perfect" outside dimensions and in so doing, enabling the attachment of microdisplays directly to the prism assembly. In turn, the latter provides several advantages the foremost being that the resulting monolithic assembly will remain in a alignment under a wide range of conditions.

An alternative means by which these advantages can be obtained is to utilize the "build from the outside in" procedure described previously but, rather than filling the prism assembly with an optical coupling liquid, leaving the assembly empty therefore "filling" with air. However, in this approach, it will be necessary to coat all surfaces now exposed with an anti-reflection thin film (AR coatings) to suppress reflections. The expansion port is not required in this configuration. In some applications it may be possible to also omit the side rails of the frame (e.g., 500B) and possibly the top (500C).

In yet another alternative, the prism assembly is filled with an epoxy that cures. Preferably the cured epoxy has an index of refraction that closely matches the index of refraction of the PBSs and optical elements utilized. In still yet another embodiment, a gel substance may also be used to fill the joints between adjacent PBSs. Again, preferably, the gel has an index of refraction that approximates that of the other parts of the prism assembly. An example gel that could be utilized is manufactured by NYE Corporation.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a spacer device constructed of rolled polycarbonate, any other equivalent device, such as a geometrically shaped (square, triangle, pentagon, hexagon, etc) or other shape roll of polycarbonate or any other material or any other device having an equivalent function or capability, whether or not listed herein, may be substituted therewith. Furthermore, the inventors recognize that newly developed technologies not now known may also be substituted for the described parts and still not depart from the scope of the present invention.

The present invention is mainly described in conjunction with a LMS that utilizes a microdisplay that operates by rotating polarization of individual pixels. However, based on the description provided herein, it should be understood that the present invention may be practiced in devices with other types of microdisplays (e.g., scattering, absorption, diffraction based microdisplays), or in optical devices constructed without microdisplays.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A prism assembly, comprising:

a set of optical components comprising at least two beamsplitters;

a baseplate attached to at least one of the optical components;

a seal affixed to at least two of the optical components; and an optical coupling fluid disposed between the sealed optical components.

2. The prism assembly according to claim 1, wherein the prism assembly is installed in a Liquid Crystal On Silicon (LCOS) video projection system.

3. A prism assembly, comprising:

a set of optical components;

a baseplate attached to at least one of the optical components;

a seal affixed to at least two of the optical components;

an optical coupling fluid disposed between the sealed optical components; and a stress compensation device operative in conjunction with the optical coupling fluid to relieve expansion related stress.

4. The prism assembly according to claim 3 wherein the prism assembly is installed in a Liquid Crystal On Silicon (LCOS) video projection system.

5. A prism assembly, comprising:

a set of optical components;

a baseplate attached to at least one of the optical components;

an seal affixed to at least two of the optical components; and a optical coupling fluid disposed between the sealed optical components;

wherein the optical coupling fluid has an index of refraction within 25% of an index of refraction of the optical components.

6. The prism assembly according to claim 5, wherein the prism assembly is installed in a Liquid Crystal On Silicon (LCOS) video projection system.

7. A method of constructing a prism assembly, comprising the steps of;

fixing a set of optical components to a baseplate in a configuration suitable for splitting an input light beam into separate light channels, modulating the separate light beams and recombining the modulated light beams into an output;

sealing spaces between the optical components; and filling spaces between the optical components with an optical coupling fluid.

8. The method according to claim 7, further comprising the step of installing the optical components in a Liquid Crystal on Silicon (LCOS) video projection system.

9. A method of constructing a prism assembly, comprising the steps of:

fixing a set of optical components to a baseplate;

sealing a perimeter of the optical components;

filling spaces between the optical components with an optical coupling fluid; and installing an expansion compensation device in the prism assembly.

10. The method according to claim 9, wherein said expansion compensation device comprises a bladder filled with a flexible substance.

11. The method according to claim 9, wherein said expansion compensation device comprises an open ended tube having a slide piston.

12. The method according to claim 9, wherein said expansion compensation device comprises a flexible diaphragm sealed over an opening into the prism assembly optical coupling fluid.

13. The method according to claim 9, wherein said expansion compensation device comprises a tube having an open end in contact with the optical coupling fluid and a closed end holding an air bubble.

14. The method according to claim 9, wherein said expansion compensation device comprises an air bubble disposed in the optical coupling fluid.

15. A device, comprising:

a prism assembly comprising a set of optical components;

a baseplate attached to at least one of the optical components;

a seal affixed to at least two of the optical components; and an optical coupling fluid disposed between the sealed optical components.

16. The prism assembly according to claim 15, wherein said seal comprises an adhesive connecting internal optical surfaces between adjacent sealed optical components.

17. The prism assembly according to claim 16, further comprising a set of at least one planar optical components disposed between at least one of the adjacent sealed optical components.

18. The prism assembly according to claim 17, further comprising spacers contained in the optical coupling fluid.

19. The prism assembly according to claim 17, where at least one of the planar optical components divides the seal between the adjacent optical component.

20. The prism assembly according to claim 15, wherein said set of optical components comprises four Polarizing Beam Splitter (PBS) components arranged in a rectangular shape;

said seal encloses the interior optical surfaces of the PBSs to form an optical coupling fluid tight container.

21. The prism assembly according to claim 20, wherein the rectangular shape is a square.

22. The prism assembly according to claim 20, wherein the rectangular shape comprises a pathlength matched optical paths through the prism assembly for three distinct light beams.

23. The prism assembly according to claim 22, wherein the three distinct light beams are red, green, and blue, each of which may contain other parts of the spectrum at different portions of the corresponding pathlength.

24. The prism assembly according to claim 15, further comprising an air bubble in the optical coupling fluid.

25. The prism assembly according to claim 24, wherein said air bubble is outside of optical pathlengths through the prism assembly.

26. The prism assembly according to claim 15, further comprising a bladder disposed in the optical coupling fluid.

27. The prism assembly according to claim 26, wherein said bladder is filled with air.

28. The prism assembly according to claim 26, wherein said bladder is filled with a flexible expansion/contraction material.

29. The prism assembly according to claim 26, wherein:

said set of optical components comprises four Polarizing Beam Splitter (PBS) components arranged in a rectangular shape with one PBS at each corner, a pathlength matching space between each adjacent PBS, and a central fill area centrally located between each PBS; and said bladder is disposed in the central fill area outside optical pathlengths through the prism assembly.

30. The prism assembly according to claim 26, wherein:

said set of optical components comprises four Polarizing Beam Splitter (PBS) components arranged in a rectangular shape with one PBS at each corner, a pathlength matching space between each edjacent PBS, and a central fill area centrally located between each PBS; and said prism assembly further comprises a cap configured to cover and seal the central fill area.

31. The prism assembly according to claim 15, wherein the optical coupling fluid is maintained between the optical components, the seal and the baseplate.

32. The prism assembly according to claim 15, further comprising a tube having an open end and a closed end, the open end in contact with the optical coupling fluid; and an air bubble disposed inside the tube.

33. The prism assembly according to claim 15, further comprising:

an open ended tube having a first end and a second end, the first end in contact with the optical coupling fluid, and the second end open to the exterior of the prism assembly;

a sealed movable piston disposed in said tube, said piston configured to move because of expansion and contraction of the optical coupling fluid.

34. The prism assembly according to claim 33, further comprising at least one stop configured to limit motion of the piston.

35. The prism assembly according to claim 15, further comprising a diaphragm disposed and sealed over an opening to the optical coupling fluid.

36. A method of constructing a prism assembly, comprising the steps of:

fixing a set of optical components to a baseplate;

sealing a perimeter of the optical components; and filling spaces between the optical components with an optical coupling fluid;

wherein the optical coupling fluid is at least one of mineral oil and other fluid having an index of refraction within 25% of the index of refraction of the optical components.

37. A method of constructing a prism assembly, comprising the steps of:

fixing a set of optical components of the prism assembly to a baseplate;

sealing a perimeter of the optical components; and filling interior spaces between the optical components of the prism assembly with an optical coupling fluid.

38. The method according to claim 37, suspending spacers in the optical coupling fluid.

39. The method according to claim 37, further comprising the steps of coating planar optical components with the optical coupling fluid; and inserting the planar optical elements between the optical components.

40. The method according to claim 37, wherein said step of fixing comprises the steps of:

arranging the optical components in a pathlength matched configuration; and attaching the pathlength matched configuration to the baseplate.

41. The method according to claim 40, wherein said step of attaching comprises gluing the pathlength matched configuration to the baseplate.

42. The method according to claim 40, wherein said step of arranging the optical components comprises setting the optical components in a tool having blocks that set outside dimensions of the prism assembly.

43. The method according to claim 42, wherein said blocks comprise corner pieces, each corner piece configured to position outside surfaces of one of the optical components.

44. The method according to claim 42, wherein at least one of said blocks include an airduct configured to apply a vacuum to the optical component set in the airducted block and hold the optical component firmly against the airducted block.

45. The method according to claim 37, further comprising the step of inserting planar optical elements between the optical components.

46. The method according to claim 37, further comprising the step of inserting planar optical elements between the optical components;

wherein said step of filling comprises filing spaces between the optical components with an optical coupling fluid having spacers suspended in the optical coupling fluid.

47. The method according to claim 37, wherein said optical components comprise 4 Polarizing Beam Splitter (PBS) devices arranged in a pathlength matched rectangular shape.

48. The method according to claim 37, wherein said step of sealing comprises fixing a frame around each of the optical components.

49. The method according to claim 37, wherein said step of sealing comprises applying adhesive between each of the optical components.

50. The method according to claim 37, wherein said step of filling spaces comprises injecting optical coupling fluid using any of a syringe or other tub based injection system.

* * * * *